(12) United States Patent
Vossiek et al.

(10) Patent No.: US 11,906,655 B2
(45) Date of Patent: Feb. 20, 2024

(54) METHOD AND APPARATUS FOR CAPTURING THE SURROUNDINGS

(71) Applicant: Symeo GmbH, Neubiberg (DE)

(72) Inventors: Martin Vossiek, Fürth (DE); Michael Gottinger, Buckendorf (DE); Peter Gulden, Erding (DE); Mark Christmann, Munich (DE); Christoph Mammitzsch, Neubiberg (DE)

(73) Assignee: Symeo GmbH, Neubiberg (DE)

(*) Notice: Subject to any disclaimer, the term of this patent is extended or adjusted under 35 U.S.C. 154(b) by 593 days.

(21) Appl. No.: 16/490,476

(22) PCT Filed: Feb. 28, 2018

(86) PCT No.: PCT/EP2018/054861
§ 371 (c)(1),
(2) Date: Aug. 30, 2019

(87) PCT Pub. No.: WO2018/158281
PCT Pub. Date: Sep. 7, 2018

(65) Prior Publication Data
US 2021/0405183 A1 Dec. 30, 2021

(30) Foreign Application Priority Data

Mar. 2, 2017 (DE) .................. 10 2017 104 377.2
May 10, 2017 (DE) .................. 10 2017 110 063.6

(51) Int. Cl.
*G01S 7/40* (2006.01)
*G01S 13/90* (2006.01)
(Continued)

(52) U.S. Cl.
CPC ............ *G01S 7/4021* (2013.01); *G01S 7/023* (2013.01); *G01S 13/003* (2013.01);
(Continued)

(58) Field of Classification Search
CPC ...... G01S 13/931; G01S 13/87; G01S 13/584; G01S 13/003; G01S 13/9021;
(Continued)

(56) References Cited

U.S. PATENT DOCUMENTS 5,557,196 A * 9/1996 Ujiie ................ G01R 29/26
324/76.13
5,963,163 A * 10/1999 Kemkemian ......... G01S 13/584
342/111
(Continued)

FOREIGN PATENT DOCUMENTS

CN 1366742 A 8/2002
CN 105452898 A 3/2016
(Continued)

OTHER PUBLICATIONS

"International Application No. PCT/EP2018/054861, Written Opinion dated Sep. 12, 2019", (English Translation), 11 pgs.
(Continued)

*Primary Examiner* — Vladimir Magloire
*Assistant Examiner* — Michael W Justice
(74) *Attorney, Agent, or Firm* — Schwegman Lundberg & Woessner, P.A.

(57) ABSTRACT

The invention relates to a radar system for capturing surroundings of a moving object, in particular a vehicle and/or a transportation apparatus, such as a crane, in particular, wherein the system is mounted or mountable on the moving object, wherein the radar system comprises at least two non-coherent radar modules (RM 1, RM 2, . . . RM N) having at least one transmitter antenna and at least one receiver antenna, wherein the radar modules (RM 1, RM 2, . . . RM N) are arranged or arrangeable in distributed fashion on the moving object, wherein provision is made of at least one evaluation device which is configured to process
(Continued)

transmitted and received signals of the radar modules to form modified measurement signals in such a way that the modified measurement signals are coherent in relation to one another.

23 Claims, 15 Drawing Sheets

(51) Int. Cl.
  *G01S 7/02* (2006.01)
  *G01S 13/00* (2006.01)
(52) U.S. Cl.
  CPC ...... *G01S 13/9021* (2019.05); *G01S 13/9023* (2013.01); *G01S 13/90* (2013.01)
(58) Field of Classification Search
  CPC ....... G01S 13/9023; G01S 2013/93271; G01S 2013/93272; G01S 7/023; G01S 7/356; G01S 7/4021; G01S 7/40
  USPC ............................ 342/173, 196, 70, 179, 194
  See application file for complete search history.

(56) References Cited

U.S. PATENT DOCUMENTS

| | | | |
|---|---|---|---|
| 6,078,281 A * | 6/2000 | Milkovich | G01S 7/2926 342/162 |
| 6,317,075 B1 | 11/2001 | Heide et al. | |
| 7,076,227 B1 * | 7/2006 | Smith | H04B 7/0857 455/562.1 |
| 7,800,368 B2 * | 9/2010 | Vaughan | G01R 33/246 324/318 |
| 7,821,422 B2 * | 10/2010 | Hutchison | G01S 13/92 348/149 |
| 7,940,743 B2 | 5/2011 | Seisenberger et al. | |
| 8,299,959 B2 * | 10/2012 | Vossiek | G01S 13/904 342/25 R |
| 8,477,888 B2 * | 7/2013 | Lu | H04B 17/345 375/346 |
| 9,057,785 B1 | 6/2015 | Lee | |
| 9,223,015 B2 * | 12/2015 | Kojima | G01S 7/023 |
| 10,051,643 B2 * | 8/2018 | Negus | H04L 5/0085 |
| RE47,026 E * | 9/2018 | Vaughan | G01R 33/5612 |
| 10,506,611 B2 * | 12/2019 | Negus | H04L 5/14 |
| 10,962,634 B2 * | 3/2021 | Gulden | G01S 13/32 |
| 2005/0046597 A1 * | 3/2005 | Hutchison | G08G 1/07 340/917 |
| 2005/0057391 A1 * | 3/2005 | Forsley | G01S 13/9023 342/25 A |
| 2006/0132357 A1 | 6/2006 | Pozgay et al. | |
| 2006/0220951 A1 * | 10/2006 | Thome | G01S 7/42 342/174 |
| 2008/0129298 A1 * | 6/2008 | Vaughan | G01R 33/583 324/322 |
| 2009/0222589 A1 | 9/2009 | Kirsch et al. | |
| 2009/0316842 A1 * | 12/2009 | Lu | H04W 52/245 375/346 |
| 2010/0321235 A1 | 12/2010 | Gulden et al. | |
| 2010/0324864 A1 * | 12/2010 | Vossiek | G01S 13/904 702/158 |
| 2011/0196568 A1 * | 8/2011 | Nickolaou | B60W 30/0953 701/31.4 |
| 2011/0292371 A1 * | 12/2011 | Chang | G01S 7/486 356/28 |
| 2013/0342383 A1 * | 12/2013 | Kojima | G01S 7/023 342/134 |
| 2017/0176583 A1 * | 6/2017 | Gulden | G01S 13/34 |
| 2018/0074191 A1 | 3/2018 | Bilik et al. | |
| 2019/0004145 A1 | 1/2019 | Vossiek et al. | |
| 2020/0077413 A1 * | 3/2020 | Negus | H04L 5/0028 |

FOREIGN PATENT DOCUMENTS

| | | | |
|---|---|---|---|
| CN | 106461770 A | 2/2017 | |
| DE | 10157931 A1 | 6/2003 | |
| DE | 102008010536 | 8/2009 | |
| DE | 102009030076 A1 | 12/2010 | |
| DE | 102014104273 | 10/2015 | |
| DE | 102014104273 A1 | 10/2015 | |
| DE | 102014104273 A1 * | 10/2015 | ............. G01S 13/50 |
| DE | 102015110619 A1 | 1/2016 | |
| EP | 2270540 A2 * | 1/2011 | ......... G01S 13/9029 |
| JP | 2007225442 | 9/2007 | |
| JP | 2008525799 | 7/2008 | |
| JP | 2008534983 | 8/2008 | |
| JP | 2008275388 | 11/2008 | |
| JP | 2017513024 | 5/2017 | |
| JP | 2017534983 | 11/2017 | |
| KR | 102397235 B1 | 5/2022 | |
| WO | 2015144134 | 10/2015 | |
| WO | WO-2015172622 A1 * | 11/2015 | ............... G01S 7/36 |
| WO | WO-2016168334 A1 | 10/2016 | |
| WO | WO-2017102159 A1 | 6/2017 | |
| WO | WO-2017118621 | 7/2017 | |
| WO | WO-2018158281 A1 | 9/2018 | |

OTHER PUBLICATIONS

"European Application Serial No. 19209160.1, Office Action dated Apr. 28, 2020", 11 pgs.
"Japanese Application Serial No. 2019-547513, Notification of Reasons for Refusal dated Jan. 25, 2021", w/ English Translation, 13 pgs.
"Japanese Application Serial No. 2019-547513, Response filed Jun. 25, 2021 to Notification of Reasons for Refusal dated Jan. 25, 2021", w/ English Translation, 17 pgs.
"International Application No. PCT/EP2018/054861, International Search Report and Written Opinion dated May 14, 2018", (May 14, 2018), 17 pgs.
Ali, Faiza, et al., "A Rotating Synthetic Aperture Radar Imaging Concept for Robot Navigation", IEEE Transactions on Microwave Theory and Techniques (vol. 62, Issue 7), Jul. 2014 [abstract only], (May 19, 2014), 1545-1553.
Capon, J., "High-Resolution Frequency-Wavenumber Spectrum Analysis", Proceedings of the IEEE, vol. 57, No. 8, Aug. 1969, (Aug. 1969), 1408-1418.
Frischen, Andreas, "A Cooperative MIMO Radar Network Using Highly Integrated FMCW Radar Censors", IEEE Transactions on Microwave Theory and Techniques, vol. 65, No. 4, (Feb. 1, 2017), 1355-1366.
Kong, Sunwoo, et al., "Wireless Cooperative Synchronization of Coherent UWB MIMO Radar", IEEE Transactions on Microwave Theory and Techniques, vol. 62, No. 1, (Jan. 1, 2014), 154-165.
Richards, Mark A., "A Beginner's Guide to Interferometric SAR Concepts and Signal Processing", IEEE Aerospace and Electronic Systems Magazine, vol. 22, Issue 9 [abstract only], (Oct. 15, 2007), 5-29.
Roehr, Sven, et al., "Precise Distance and Velocity Measurement for Real Time Locating in Multipath Environments Using a Frequency-Modulated Continuous-Wave Secondary Radar Approach", IEEE Transactions on Microwave Theory and Techniques, vol. 56, Issue 10 [abstract only], (Sep. 12, 2008), 2329-2339.
Schiessl, Andreas, et al., "Hardware realization of a 2 m × 1 m fully electronic real-time mm-wave imaging system", EUSAR 2012; 9th European Conference on Synthetic Aperture Radar, Nuremberg, Germany, Apr. 23-26, 2012 [abstract only], (Jun. 15, 2012), 1.
Schmidt, Ralph O., "Multiple Emitter Location and Signal Parameter Estimation", IEEE Transactions on Antennas and Propagation, vol. AP-34, No. 3, Mar. 1986, (Mar. 1986), 276-280.
Zankl, Dominik, et al., "BLASTDAR—A Large Radar Sensor Array System for Blast Furnace Burden Surface Imaging", IEEE Sensors Journal, vol. 15, No. 10; abstract only, (Jun. 15, 2015), 5893-5909.

(56) References Cited

OTHER PUBLICATIONS

"European Application Serial No. 19209160.1, Office Action dated Apr. 28, 2020", (w/ Concise Statement of Relevance), 11 pgs.

Frischen, Andreas, et al., "A Cooperative MIMO Radar Network Using Highly Integrated FMCW Radar Sensors", *IEEE Transactions on Microwave Theory and Techniques*, 65(4), (Apr. 2017), 1355-1366.

"German Application Serial No. 102017110063.6 dated Dec. 20, 2017", (w/ Concise Statement of Relevance), 10 pgs.

"European Application Serial No. 18708108.8, Communication Pursuant to Article 94(3) EPC dated Dec. 6, 2021", 6 pgs.

"Indian Application Serial No. 201917039694, First Examination Report dated Nov. 2, 2021", 7 pgs.

"Japanese Application Serial No. 2019-547513, Examiners Decision of Final Refusal dated Oct. 4, 2021", w/ English translation, 8 pgs.

"Japanese Application Serial No. 2019-547513, Preliminary Examination Report dated Apr. 11, 2022", w/ English Translation, 2 pgs.

"European Application Serial No. 19209160.1, Communication Pursuant to Article 94(3) EPC dated Nov. 28, 2022", 4 pgs.

"Chinese Application Serial No. 201880028424.5, Office Action dated Feb. 21, 2023", w/ English Translation, 27 pgs.

Scheiblhofer, Stefan, et al., "Performance Analysis of Cooperative FMCW Radar Distance Measurement Systems", 2008 IEEE MTT-S International Microwave Symposium Digest, (2008), 121-124.

Wu, Zhiping, "Suppression of Transmission Leakage and Phase Noise in FMCW Radar", CMFD IT, (Mar. 15, 2016).

"Chinese Application Serial No. 201880028424.5, Office Action dated Sep. 7, 2023" W/English Translation, 8 pgs.

"Japanese Application Serial No. 2019-547513, Notification of Reasons for Refusal dated Sep. 25, 2023", w/ English Translation, 9 pgs.

\* cited by examiner

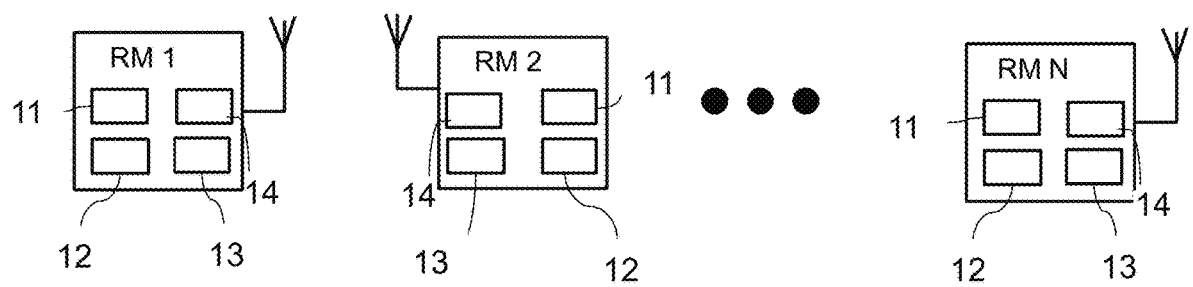
Fig. 5
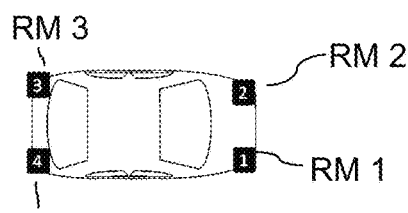
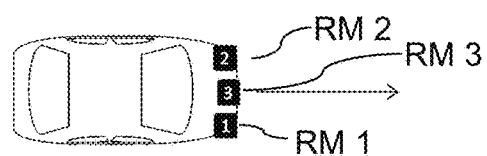
Fig. 6a
Fig. 6b
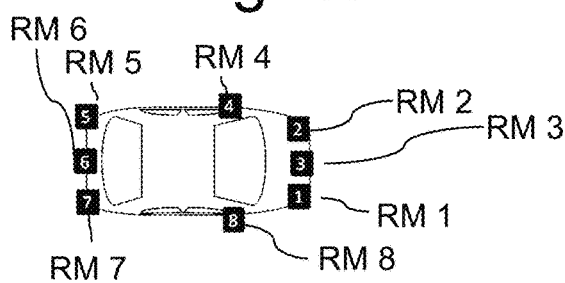
Fig. 6c

METHOD AND APPARATUS FOR CAPTURING THE SURROUNDINGS

PRIORITY CLAIM TO RELATED APPLICATIONS

This application is a U.S. national stage filing under 35 U.S.C. § 371 of International Application No. PCT/EP2018/054861, filed on 28 Feb. 2018, and published as WO2018/158281 on 7 Sep. 2018, which claims priority to German Application No. 10 2017 104 377.2, filed on 2 Mar. 2017, and to German Application No. 10 2017 110 063.6, filed on 10 May 2017, the benefit of priority of each of which is claimed herein, and which applications and publication are hereby incorporated herein by reference in their entirety.

The invention relates to a radar system for capturing the surroundings of a moving object, as well as to a corresponding method.

Prior art uses radar for capturing the surroundings of a moved object, for example a vehicle, in particular an autonomous vehicle, a robot (or a part thereof), a crane system (or a part thereof), etc. The objective here is to capture the surroundings as precisely as possible, in particular in relation to distance, lateral position, velocity and, if necessary, proper motion. The precise capture involves both a good separation (differentiation) of individual targets as well as a most precise possible capture of the individual separated targets.

In first approximation, the distance resolution for radar measures:

$$\Delta d = \frac{c}{2B}$$

with c as the speed of light, and B as the signal bandwidth.

In first approximation, the resolution of velocity for identically sized targets measures:

$$\Delta v = \frac{c}{2T_{sw} \cdot f_c}$$

with $T_{sw}$ as the measuring duration and $f_c$ as the center frequency ("center frequency") of the radar signal.

The lateral resolution is usually indicated in polar coordinates in relation to the origin of the radar wave, and measures:

$$\Delta \alpha = 0{,}67 \cdot \frac{c}{f_{start} \cdot l_{ant}}$$

with $f_{start}$ as the starting frequency of the signal, and $l_{ant}$ as the expansion of the antenna (or the aperture of the antenna in the plane in which the angle is measured).

The depth and velocity resolution or accuracy achievable with conventional radar systems (in the authorized frequency bands) are here sufficient for most tasks in the area of capturing the surroundings. Important limiting factors in capturing the surroundings include the previously achieved angular resolution (i.e., the ability to separate or resolve several adjacent targets via the angle) and the accuracy of angle measurement.

According to prior art, a high angular resolution and accuracy can be realized over a large, spatially expansive antenna array, for example in *Hardware Realization of a 2 m×1 m Fully Electronic Real-Time mm-Wave Imaging System*, A. Schiessl, A. Genghammer, S. Ahmed, L.-P. Schmidt, *EUSAR* 2012, or *BLASTDAR—A Large Radar Sensor Array System for Blast Furnace Burden Surface Imaging*, D. Zankl et al., *IEEE Sensor Journal*, Vol. 15, No. 10, October 2015.

In prior art, all transmitting and receiving paths must be fed from the same HF source. Here and below, "HF" stands for high frequency, i.e., in particular for a frequency of over 100 MHz, preferably of over 1 GHz. Correspondingly large high frequency substrates are required, which are technically complicated to manufacture and handle. Furthermore, HF antennas can be problematic starting at a specific size with respect to transmission and coherence length for the individual paths. In addition, the antennas are rigidly arranged on an HF substrate. Arrangements with several substrates and connecting cables in between are technically very complex or cannot be implemented in a phase stable manner at the frequencies commonly used (often above 10 GHz), and thus do not represent a practical alternative. As a whole, it is regarded as problematic in prior art that known methods for increasing the (lateral) accuracy and resolution of radar systems are comparatively complex and expensive, or cannot be implemented in practice.

The object of the invention is to propose a method or a system for capturing the surroundings, which permits a comparatively high (lateral) accuracy and resolution at a low outlay.

This object is achieved in particular by a radar system for capturing the surroundings of a moving object according to claim 1, as well as by a corresponding method according to claim 14.

In particular, the object is achieved by a radar system for capturing the surroundings of a moving object, in particular a vehicle and/or a transport device, in particular a crane, wherein the system is mounted or mountable on the moving object, wherein the radar system comprises at least two (non-coherent) radar modules with at least one transmitter and at least one receiver antenna, wherein the radar modules are arranged or arrangeable on the moving object in a distributed fashion, wherein at least one evaluation device is provided, which is configured to process transmitted and received signals of the radar modules into modified measurement signals in such a way that the modified measurement signals are coherent in relation to each other (as though the transmitted and received signals from which the latter were derived originate from a common source).

A core idea of the invention lies in configuring the radar system in such a way that the transmitted and received signals of the radar modules are processed into modified measurement signals (in postprocessing), so as to generate coherent, modified measurement signals from the signals (that are basically not coherent in relation to each other). This results in signals that on the one hand are derived from the transmitted and received signal, and on the other hand are coherent, just as though they originated from a common source. This makes it possible to easily (distinctly) improve the accuracy and resolution of the radar system.

The at least two radar modules are preferably connected with each other via a bus system. In general, the at least two radar modules can each form a self-contained unit. The at least two radar modules can be (spatially) separated or spaced apart from each other (for example, by at least 10 cm).

The radar system is preferably configured in such a way that
- a first signal is (or can be) generated in a first radar module and transmitted, in particular emitted, over a path,
- an additional first signal is (or can be) generated in an additional, in particular a second, radar module, and transmitted, in particular emitted, over a path,
- a first comparison signal is (or can be) formed out of the first radar module and out of such a first signal received by the additional radar module over the path in the evaluation device, in particular in the first radar module,
- a first comparison signal is (or can be) formed out of the first signal of the additional radar module and out of such a first signal received by the first radar module over the path in the evaluation device, in particular in the additional radar module,
- wherein the additional comparison signal is preferably transmitted, in particular communicated, from the additional radar module to the first radar module.

In another conjunction, such a system is basically known from DE 10 2014 104 273 A1. In particular as relates to further developments of the system described in the preceding paragraph, reference is thus made to DE 10 2014 104 273 A1, the disclosure content of which is intended to be part of the present disclosure (especially in relation to further developments or specifications of the aspect described in the preceding paragraph). In this conjunction, let it be noted that the transmitter-receiver units mentioned in DE 10 2014 104 273 A1 can be an integral part of the radar modules mentioned in the present disclosure. As a whole, the resolution and accuracy of capturing the surroundings is distinctly improved with little effort by such a functionality, in particular when combined with methods for radar imaging. In particular, generating a coherence for the basic signals can result in the ability to apply a method for radar imaging to the resultantly possible larger array. The radar imaging method can then profit from the larger array.

The radar system, in particular the evaluation device for forming a comparison-comparison signal, is especially preferably configured out of the first comparison signal and the additional comparison signal. Reference is also made to DE 10 2014 104 273 A1 with respect to forming the comparison-comparison signal, wherein the related disclosure content is intended to be made part of the present disclosure by way of reference.

The method or corresponding configuration according to DE 10 2014 104 273 A1 for creating modified, coherent (measurement) signals will be referred to below as "method I" or "configuration I".

A further development or modification of method I or configuration I is described in the as yet unpublished German patent application with the application number 10 2016 100 107.4 as well as the corresponding international patent application with the application number PCT/EP2017/050056. The disclosure of these applications is also intended to be the subject matter of the disclosure of the present application by way of reference, in particular as relates to the formation of the coherent (measurement) signals. The method or configuration for forming the coherent (measurement) signals according to the just mentioned application will be referred to as "method II" or "configuration II" below.

As basically the case in method II or configuration II, the system, in particular the evaluation device, is preferably configured to compensate for deviations in the comparison signals caused by systemic deviations in the radar modules, and in a second step to use at least one complex value from a first of the two comparison signals or a signal derived from this first comparison signal to adjust at least one complex value of the second of the two comparison signals or a value of a signal that was derived from this second comparison signal, and thereby form an adjusted signal, wherein the adjustment takes place in such a way that a mathematical operation forms the vectorial sum or the difference of complex values, or forms the sum or the difference of the phases of the complex values.

Further developments and specifications of the method II or configuration II will be described in detail further below. As a whole, the method II or configuration II realizes a radar system that in the present case of capturing the surroundings enables an especially high resolution or accuracy in the capturing process with simple means and in particular without any major computing outlay, in particular when combined with methods for capturing the surroundings.

Preferably (as basically described in DE 10 2014 104 273 A1), the comparison-comparison signal, in which the two comparison signals are processed with each other, in particular subjected to conjugated complex multiplication, can correspond to a comparison signal generated with a coherent radar system.

The first and/or second radar module preferably has/have (a respective) at least one, further preferably at least two (in particular separate) transmitter antenna(s) and/or at least one, preferably at least two (in particular separate) receiver antenna(s). Alternatively or additionally, the first and/or second radar module(s) has/have at most four, preferably at most three (in particular separate) transmitter antennas and/or at most five (preferably at most four) receiver antennas. The radar modules thus preferably have at least one transmitter and at least one receiver antenna. The transmitter antenna and receiver antenna can also be designed as a (combined) transmitter and receiver antenna (i.e., as a single antenna for both transmission and reception). Several transmitter and receiver antennas are preferably accommodated on a module, wherein 1 to 3 transmitter antennas and 2 to 4 receiver antennas are further preferably present (which has proven to be an advantageous compromise between size and array allocation for the present application). The radar modules (each) preferably comprise a device for generating the HF signal (HF generator). The radar modules can further have a device (comprising one or several antennas) for sending the HF signal as well as a device (comprising one or several antennas) for receiving the HF signal. The radar modules can (each) further have a device for converting the HF signal to a lower frequency level, e.g., by means of a mixer or correlator. The radar modules (each) preferably have a separate (local) clock source for the system clock and possibly an AD converter.

The radar modules can be arranged in distributed fashion, for example around a vehicle and/or facing forward to cover the direction of movement, facing downward, for example, in particular in the case of a crane system. The radar modules can then exchange the received signals with each other or with a central computing unit (evaluation unit). This preferably takes place via a (digital) data bus.

The spatial distribution of the individual radar modules makes it possible to form a shared aperture for the entire radar system. Antennas of the (individual) radar modules can represent individual antenna elements. The radar modules are preferably arranged comparatively far apart from each other, for example at a distance of at least 5 cm, preferably of at least 10 cm, even more preferably of at least 40 cm. A maximum distance can be less than 10 m, preferably less than 5 m, even more preferably less than 2 m, even more preferably less than 1.50 m. Alternatively or additionally, the radar modules are arranged so far apart from each other that the resultant aperture is spread thin (i.e., only a smaller share of transmitter and receiver antennas or transmitter and receiver patches is present over a complete antenna array; sparse array). As a rule, such thinly spread arrays have high side lobes. This can be optimized by individual layouts. At least three radar modules are especially preferably used, making it possible to further suppress the side lobs. In particular, a thinly spread array (sparse array) is to be understood as an array in which a distance between the individual transmitter and receiver devices (antennas) is greater than $\lambda/2$ ($\lambda$=(average) wavelength of the transmitted signals). In particular, a sparse array is also a layout in which the transmitter and receiver antennas are not arranged in a periodic grid so as to fully occupy it.

A calibration measurement is preferably (in particular after the individual radar modules have been assembled) performed with the radar modules (preferably on a single target whose position is precisely known). By comparing the actually measured angle with a prescribed angle, (optimal) correction factors can here be calculated for each reception path. It is here especially preferred that the (complex) correction terms for each reception path be adjusted in such a way that a peak for the known target become as high and narrow as possible. This makes it possible to compensate for various phase offsets of the radar modules.

In particular if a redundancy (with respect to the measured angle) is present in the measured signals (which can be the case especially when using radar modules with several transmitter and receiver paths), it is particularly advantageous to perform a self-calibration, in which the exact position of individual targets need not be known apriori. From the standpoint of an optimization problem, the (complex) correction terms can here be adaptively adjusted in such a way that estimating the angle to a target from all radar modules yields an (ideally) consistent result.

The radar system, in particular the evaluation device, is preferably configured to determine an angular position of a surrounding structure by means of a phase monopulse method. Alternatively or additionally, the system, in particular the evaluation device, can be configured to estimate, in particular determine, a/the angular position of a/the surrounding structure by means of a method in the state space. In general, the radar system can be configured in such a way that targets are first separated according to distance and velocity criteria, for example by means of range doppler evaluation. The angle can then be determined via interferometry processing (also referred to as the phase monopulse method in radar engineering). For example, a range doppler diagram can here be generated in a first step for each reception channel. A phase difference between two (tightly) adjacent channels can then be determined for specific targets in a radar spectrum. The phase difference to a more remotely located channel can subsequently be determined to increase the accuracy. The accuracy can here be increased by the (now) distinctly enlarged base length between the channels. Methods in the state space are preferably used to improve or increase the angular resolution (in particular to improve the side lobe suppression). Use can here preferably be made of the MUSIC method according to *Multiple Emitter—Location and Signal—Parameter Estimation*, R. Schmidt, IEEE TRANSACTIONS ON ANTENNAS AND PROPAGATION, VOL. AP-34, NO. 3, MARCH 1986 (especially preferably for side lobe suppression in sparse arrays). Alternatively or additionally, use can be made of the Capon method according to *High-Resolution Frequency-Wavenumber Spectrum Analysis*, J. Capon, *Proceedings of the IEEE*, Vol. 57, No. 8, August 1969. The Capon method is to be preferred in particular, since it requires no assumption about the number of targets. Such an estimate can be performed in state space processes based upon an amount of intrinsic values of a covariance matrix, and is comparatively difficult to perform in practice, in particular with coherent signals, since these do not differ distinctly in terms of amount. By comparison to the application of these methods for the direction-of-arrival estimate using far field approximation, a correction of the hypothesis to be verified (referred to in this context as "steering vector") should preferably be performed in this application. For example, this can be done based upon the hypothesis of a holographic method (see below for details), if necessary after calculating a beat spectrum. Alternatively, a closed solution by means of known methods can also be used, but the latter are comparatively CPU intensive.

The system, in particular the evaluation device, is preferably configured to capture a surrounding structure using the holography method, further preferably to use the holography method for estimating an angular position and/or an, in particular vectorial (relative), velocity and/or an, in particular a vectorial (relative) acceleration of the surrounding structure. Alternatively or additionally, the system, in particular the evaluation device, is configured to perform a calibration using the holography method.

The radar system, in particular the evaluation device, is preferably configured to determine a (lateral) velocity or a velocity vector, in particular by means of a method for comparing a change in the differential phases of reception channels. Alternatively or additionally, the system, in particular the evaluation device, is preferably configured to determine a (lateral) acceleration or an acceleration vector, in particular by means of a method for comparing a change in the differential phases of reception channels.

A significantly enlarged aperture can basically also be used to improve the (vectorial) motion estimation. Previous radar systems usually only estimate a radial velocity of a system via the doppler effect. However, it is also possible to estimate the change in a phase difference between the channels over several reception channels. A lateral velocity can be estimated therefrom. However, these basic considerations only yield precise results at a larger distance of the antennas. Therefore, it is especially preferable to build up a sparse array, so that a precise estimate can be performed with at least two modules at a larger distance (e.g., of greater than 10 cm). A preferred realization of an evaluation can here be performed with the FMCW chirp sequence method. For example, a burst of several, e.g., 128, frequency ramps (with identical slope) can first be sent out simultaneously (or overlapping) by the at least two radar modules. For example, the received signals can then be separated according to S. Roehr, P. Gulden and M. Vossiek, "*Precise Distanc and Velocity Measurement for Real Time Locating in Mulipath Environments Using a Frequency-Modulated Continuous-Wave Secondary Radar Approach*", IEEE Trans. Microw. Theory Tech., vol. 56, no. 10, pp. 2329-2339, October 2008. A processing step can then take place for an indirect path, for example according to method II or configuration II. A range doppler diagram can subsequently be calculated (for each path), and the object position and velocity can be determined. The angular position can here be determined from the phase difference of the receiving channels according to known methods (e.g., by means of phase monopulse or holography). A differential phase change from ramp to ramp can subsequently be determined (angular velocity). The latter can then be converted into the lateral velocity with a measured distance. As a consequence, the vectorial velocity can then be determined as the sum of the lateral and radial velocity. This method significantly improves the process of capturing the surroundings, since the complete motion vector of the objects is present in the surroundings. The measuring accuracy of the lateral velocity is improved when a distance between the radar modules (a base between the modules) is large.

In addition to the (lateral) velocity, a (lateral) acceleration can also be determined (by again differentiating or subtracting the phase difference changes), in particular when using at least three receiver antennas. If a radial acceleration is then determined from potentially at least three sequentially recorded radar spectra, the vectorial acceleration can thus also be determined. In this conjunction as well, it is especially advantageous that the antennas be spaced apart at a comparatively large distance from each other.

The near field approximation basically only applies starting at a target distance of $r=2 \cdot L^2 \cdot f/c$, wherein L is the spatial expansion of the antenna aperture, f is the transmission frequency, and c is the speed of light. For the example of an array with a width of 1 m and a transmission frequency of 76 GHz, the validity of the near field approximation is only given starting at approx. 507 m. For this reason, the radar image is advantageously calculated holographically for large arrays, for example according to *A Rotating Synthetic Aperture Radar Imaging Concept for Robot Navigation*, F. Ali, G. Bauer and M. Vossiek, *IEEE TRANSACTIONS ON MICROWAVE THEORY AND TECHNIQUES*, VOL. 62, NO. 7, JULY 2014. This disclosure is hereby a part of the present disclosure by way of reference (especially as regards the holographic calculation).

The system, in particular the evaluation device, is preferably configured for a SAR application and/or a (SAR) imaging process. SAR here stands for Synthetic Aperture Radar. In particular the use of a large (distributed) aperture is advantageous for SAR applications.

The radar modules are preferably arranged or arrangeable on the moving object at a varying height, in particular for measuring a height of a surrounding object in an environment of the moving object, preferably by means of (interferometric) SAR processing. For example, the radar modules can have a distance in a vertical direction of at least 5 cm, preferably of at least 10 cm, even more preferably of at least 25 cm. For example, [a first radar module can be arranged] in a bumper of a motor vehicle and a second radar module can be arranged on/in the roof of the motor vehicle and/or at least one radar module can be arranged in the area of the interior mirror. This results in a significant overall improvement in height measurement or height detection, for example for automatic parking processes.

Also advantageous is a layout with three or more systems at varying heights. A transit time difference between several, in particular all, stations can here then be drawn upon, in particular also according to the approach taken in the German patent application not yet published at the time of the application with the application number DE 10 2015 121 724.4 or the corresponding international patent application with the application number PCT/EP2016/07596.

In a preferred embodiment, phase noise or phase variations is/are corrected (wherein the system, in particular the evaluation device, can be configured accordingly). The system, in particular the evaluation device, is configured to organize the phase noise portion in one term for a variation within a measuring spectrum (or a sweep or a ramp) and a variation from measuring spectrum to measuring spectrum (or from sweep to sweep or from ramp to ramp). The variation from measuring spectrum to measuring spectrum is preferably determined as a first (separate) step (and corrected as needed). This makes it possible to significantly improve the accuracy of a measurement result. λ/the variation of the phase noise portion from measuring spectrum to measuring spectrum is preferably determined as a (combined) portion in two stations from the (combined) variation of the phase in each spectrum, preferably via the scalar product of the two measuring spectra. Two (the two) measuring spectra are preferably added. These measures also improve the accuracy of the measurement result. As an option, the amplitudes of the spectra can be standardized to an absolute normal or to each other beforehand. In particular, phase noises or phase variations can easily be corrected.

If necessary, (in particular before a phase noise correction) a (preferably differential) correction of drift and/or jitters and/or a correction (in particular after the drift or jitter correction) of a transit time and/or frequency offset can take place. In particular the aspects mentioned in this and the preceding paragraph also constitute (optionally) independent subject matters of the present invention, even as a further development of method I or method II. In this conjunction, the additional features of claim 1 (as well as of the additional independent claims) are potentially only optional. For example, the radar modules can in this case be arranged in a stationary manner.

An (optionally independent) aspect of the invention is (thus) a radar system (with movable or stationary radar modules or non-coherent transmitter-receiver units), in particular for capturing the surroundings of a (moving or non-moving) object, wherein the system is in particular mounted or mountable on the object, wherein the radar system comprises at least two (in particular arranged in a distributed fashion) non-coherent radar modules with at least one transmitter and at least one receiver antenna, wherein the radar modules are in particular arranged or arrangeable on the object in a distributed fashion, wherein at least one evaluation device is provided, which is configured to process transmitted and received signals of the radar module into modified measurement signals, such that the modified measurement signals are coherent to each other, wherein a correction of a phase noise or phase variants takes place (wherein the system, in particular the evaluation device, can be configured accordingly). The (possibly stationary) system, in particular the evaluation device, is configured to organize a phase noise portion in a term for a variation within a measuring spectrum (or a sweep or a ramp) and a variation from measuring spectrum to measuring spectrum (or from sweep to sweep or from ramp to ramp). The variation from measuring spectrum to measuring spectrum is preferably determined as the first (separate) step (and corrected as needed). A/the variation of the phase noise portion from measuring spectrum to measuring spectrum is preferably determined as a (combined) portion in both stations from the (combined) variation of the phase in each spectrum, preferably via the scalar product of the two measuring spectra. Two (the two) measuring spectra are preferably added. As an option, the amplitudes of the spectra can be standardized to an absolute normal or to each other beforehand. In particular, phase noises or phase variations can easily be corrected.

Another (optionally independent) aspect of the invention is (thus) a radar method (using movable or stationary radar modules or non-coherent transmitter-receiver units), in particular for capturing the surroundings of a (moving or non-moving) object, in particular using the above system and/or the above object, wherein at least two non-coherent radar modules are arranged on and/or in the object in a distributed fashion,
wherein transmitted and received signals of the radar modules are processed into modified measurement signals, such that the modified measurement signals are coherent to each other, wherein a correction of a phase noise or phase variations takes place. A phase noise portion is preferably organized in a term for a variation within a measuring spectrum (or a sweep or a ramp) and a variation from measuring spectrum to measuring spectrum (or from sweep to sweep or from ramp to ramp). The variation from measuring spectrum to measuring spectrum is preferably determined as the first (separate) step (and corrected as needed). A/the variation of the phase noise portion from measuring spectrum to measuring spectrum is preferably determined as a (combined) portion in both stations from the (combined) variation of the phase in each spectrum, preferably via the scalar product of the two measuring spectra. Two (the two) measuring spectra are preferably added. As an option, the amplitudes of the spectra can be standardized to an absolute normal or to each other beforehand. In particular, phase noises or phase variations can easily be corrected.

In particular, a path is to be understood as an (air) interface, via which the corresponding signals (and possibly comparison signals) can be sent or transmitted and received by means of antennas.

An indirect path (way) or crossed path is to be understood as the path (way) that originates from one (e.g., the second) radar module and is received by another (e.g., the first) radar module. Accordingly, a direct path is to be understood as a signal that is both sent and also received (as a reflected signal) by one and the same radar module.

A non-coherent radar module is to be understood as a radar module whose sent signal is not coherent in relation to the signal of an additional radar module (even if the signal of the first radar module or additional radar module is itself coherent).

To the extent that calculations, evaluations or other procedural steps are performed in the (respective) radar module, these also include a potentially physically self-contained evaluation device, which is connected to the radar module. For example, the respective radar module can thus be designed as a layout of in particular one or several antennas with a handful of signal-generating or signal-processing components, while additional components, such as signal comparison units or an evaluation device are connected to such a layout as structurally self-contained components. If components are used, the latter can, where technically feasible, as so-called hardware be comprised of processing components and/or converted into signal or data processing steps executed entirely or partially in a processor.

In general, the evaluation device can be part of one or several (both) radar modules, or be connected to one or several (both) of such radar modules. If necessary, a physically self-contained evaluation device can be provided, which is connected to the respective radar module or the remaining components of the respective radar module. Alternatively, the evaluation device can possibly be integrated into the first and/or the additional (non-coherent) radar module, for example in a shared housing and/or as a unit.

What is critical in each case (regardless of where the evaluation device is specifically arranged) is that a crossed path (indirect path) can arise, i.e., that transmitting and receiving areas are correspondingly covered.

The method II or configuration II will be described further below, wherein the (non-coherent) transmitter and receiver units are intended to be part of the radar modules described further above (or form the latter). The non-coherent transmitter and receiver units are also abbreviated to NKSE.

According to method II, signals transmitted between the NKSE's are processed in such a way that comparison signals arise, which have advantageous properties otherwise only exhibited by radar signals that work with only one shared device for signal generation, i.e., with a coherent signal source. The subject matter of method II relates in particular to methods for reducing disruptive effects, which are caused by the uncorrelated phase noise of the several self-contained devices for signal generation.

Method II can especially preferably be applied to the radar modules arranged in a distributed fashion, which can form a network.

In the area of radar signal processing, the goal is to convert the received signals into an intermediate frequency signal with the lowest possible noise, so as to achieve a high accuracy and wide range. It must here be assumed that there are several expansion paths between the transmitter and receiver. In principle, it is possible to suppress the received multipath expansions and correlated noise portions via bandpass filtering using a filter tailored precisely to the expected frequency. In practice, however, this process is difficult to implement, since synchronization errors involving the sampling points and local oscillator frequencies only allows an exact prediction of the beat signals generated after the mixing process within a limited framework. These problems reduce the correlation between the phase noise for these two signals, and increase the estimation error of the phase.

This is why methods with calculation steps in which the influences of phase noise and synchronization errors are reduced or completely suppressed are advantageous.

Method II begins with at least two NKSE's transmitting at nearly the same time. In this conjunction, at nearly the same time means that the transmitted signals sigTX1 and sigTX2 are transmitted in both directions over a large part of their signal duration, i.e., sigTX1 from NKSE1 to NKSE2 and sigTX2 from NKSE2 to NKSE1. The initially potentially unknown difference between the starting times for the transmitted signals sigTX1 and sigTX2 is referred to as T_off. The goal is to have transmission times that are ideally identical; the T_off displacement should preferably not be greater than half the signal duration, but in any event be less than the signal duration. Due to the at least partially self-contained generation, signals sigTX1 and sigTX2 have non-correlated signal portions, which can be attributed to the phase noise of the signal sources in the NKSE1 and NKSE2 stations.

In such a layout, the same antennas are preferably used for transmission (Tx) and reception (Rx), so as to ensure the reciprocity of the transmission channels. In the case of layouts in an array (e.g., MIMO), it must be ensured that preferably at least one of the transmission paths is reciprocal. Using a transmission mixer in at least one transmission and reception path of the NKSE is especially suitable for achieving the reciprocity. One exemplary form of realizing a transmission mixer in a radar system is described in U.S. Pat. No. 6,317,075 B1, for example.

As a further step, the comparison signals (sigC21; sigC12) are then formed in each NKSE, specifically between the respectively received signal and the transmitted signal, or with a portion of the transmitted signal correlated with the transmitted signal or the phase noise. The method for forming these comparison signals corresponds to the approach in patent application DE 10 2014 104 273 A1.

According to the invention, phase noises and synchronization errors are then at least reduced by processing the received signals in two stages: In a first step, systematic deviations are corrected, either prior to the reception of the signals via an actuation of the signal source, and/or via a compensation directly in the received signal and/or via a compensation in the comparison signal. As a second step, for example, there is then an abbreviated evaluation of the correlation, or the formation of a comparison-comparison signal only for the expected displacement area or at best in only one displacement value.

Contrary to what is stated in DE 10 2014 104 273 A1, it is especially preferable not to use multiplication for phase compensation, but rather an addition of the complex signals. The use of addition in place of multiplication is enabled by the first processing step described above, i.e., by compensating the systematic deviations beforehand.

Signal multiplication or division constitutes a nonlinear operation. Nonlinear operations are always accompanied by nonlinear effects, i.e., here in particular by so-called intermodulations of signal and noise portions. This leads to disturbances, in particular in the case of radar signals with several signal components, i.e., signals that comprise several targets or several signal transmission paths. The major advantage to the application involving the addition of complex signals proposed according to method II is that addition is a linear operation, so that nonlinear effects, i.e., in particular intermodulations of signal and noise portions, are avoided. As a rule, then, this embodiment variant leads to a distinctly better reduction in phase noise by comparison to methods for the combination of comparison signals sigC21 and sigC12.

As a result, phase noise/the influence of phase noise is suppressed in method II, without the occurrence of the additional interferences mentioned above, which would be expected in DE 10 2014 104 273 A1. In addition, this approach is technically advantageous, since it requires a significantly lower computing outlay than necessitated by the complete multiplication or correlation proposed as an embodiment in DE 10 2014 104 273 A1.

In order to be able to execute the process according to method II, a precise, either direct (via controllable hardware) and/or synthetic (computer) synchronization is preferably first performed, so as to (at least largely) compensate for the frequency offset. A linearized approach can then be used, which causes the correlated portion of the disturbance to be cancelled out only given slight, residual phase differences (principle shown on FIG. 3).

Synchronization can here be performed separately before the measurement, within the framework of the measurement itself, or after the measurement. Given a synchronization within the framework of the measurement or thereafter, for example, the synchronization can take place by subsequently adjusting the comparison signal.

Synchronization can be provided with means or methods that are suitable for either directly (e.g., via TCXO) or computationally (synthetic synchronization) adjusting the clock rates of the sources of sigTX1 and sigTX2 to each other.

All known methods can be used for adjusting clock sources in distributed stations. Especially advantageous approaches to synchronization include methods according to U.S. Pat. No. 7,940,743, patent application DE102008010536, or the substitution of reference clocks or reference signals. Another method for clock adjustment within the measurements for FMCW signals is described further below.

All of these methods for adjusting the clock sources can be implemented using either radio waves or cable connections. Corded can refer to electrical signals or optical signals that are carried by cables.

As an alternative or in order improve the method for adjusting clock sources, use can also be made of very high quality clock sources, for example atomic clocks.

After the synchronization step, the comparison signals can have derived from them signals (sigEP21, sigEP12), which each represent a function that as the function argument has the signal transit time or the length of the transmission channel of the respective signal component.

For example, the offset T_off between the stations is then determined by the methods disclosed in DE 10157931, or by correlating the comparison signals of the at least two NKSE's. The maximum can here yield the offset. Use can alternatively also be made of the method described further below for FMCW signals. As before, the methods implemented can be corded or involve radio waves.

Determinable from signal sigEP21 is at least one function value F1, to which a specific transit time is to be allocated, and at least one additional function value F2 of signal sigEP12, to which ideally exactly the same transit time is to be allocated. F1 and F2 are then set off against each other. For example, this offset takes place by adding or subtracting the two transit time values.

This makes it possible to eliminate or at least reduce disturbances owing to the non-correlated signal portions of the signals sigTX1 and sigTX2, which can be attributed to the phase noise of the signal.

The steps of method II will be summarized below:

Method for reducing disturbances owing to phase noise in a radar system, in which
  in a first, non-coherent transmitter-receiver unit (NKSE1), a first signal is generated (sigTX1) and transmitted, in particular emitted, over a path (SP),
  in an additional, in particular second non-coherent transmitter-receiver unit (NKSE2), an (additional) first signal (sigTX2) is generated and transmitted, in particular emitted, over the path (SP),
  the signals (sigTX1 and sigTX2) in the respective other transmitter-receiver unit are received directly or indirectly, and there further processed as received signals sigRX12 and sigRX21,
  in the first transmitter-receiver unit (NKSE1), a comparison signal (sigC12) is formed out of its first signal (sigTX1) and out of such a first signal (sigRTX2) received by the additional transmitter-receiver unit (NKSE2) over the path (SP), and
  in the additional transmitter-receiver unit (NKSE2), an additional comparison signal (sigC21) is formed out of its first signal (sigTX2) and out of such a first signal (sigTX1) received by the first transmitter-receiver unit (NKSE1) over the path (SP),
  wherein the additional comparison signal (sigC21) is transmitted, in particular communicated, from the additional transmitter-receiver unit (NKSE2) to the first transmitter-receiver unit (NKSE1),
  wherein, in a first step, deviations between the signals sigC21 and sigC12 caused by systematic deviations in the transmitter-receiver units (NKSE2, NKSE1) are compensated,
  wherein, in a second step, at least one complex value from a first of the two comparison signals or from a signal derived from this first comparison signal is used to adjust at least one complex value of the second of the two comparison signals or a value of a signal derived from this second comparison signal, and thereby form an (adjusted) signal (sigCC), wherein the adjustment takes place in such a way that the vectorial sum or difference of the complex values or the sum or difference of phases of the complex values is formed via a mathematical operation.

Exemplary embodiments will be explained in more detail below based on the figures.

Shown on:

FIG. 5 is a schematic view of a configuration of several radar modules;

FIG. 6A-6C are various embodiments for radar modules distributed on a motor vehicle;

Figure 18A:
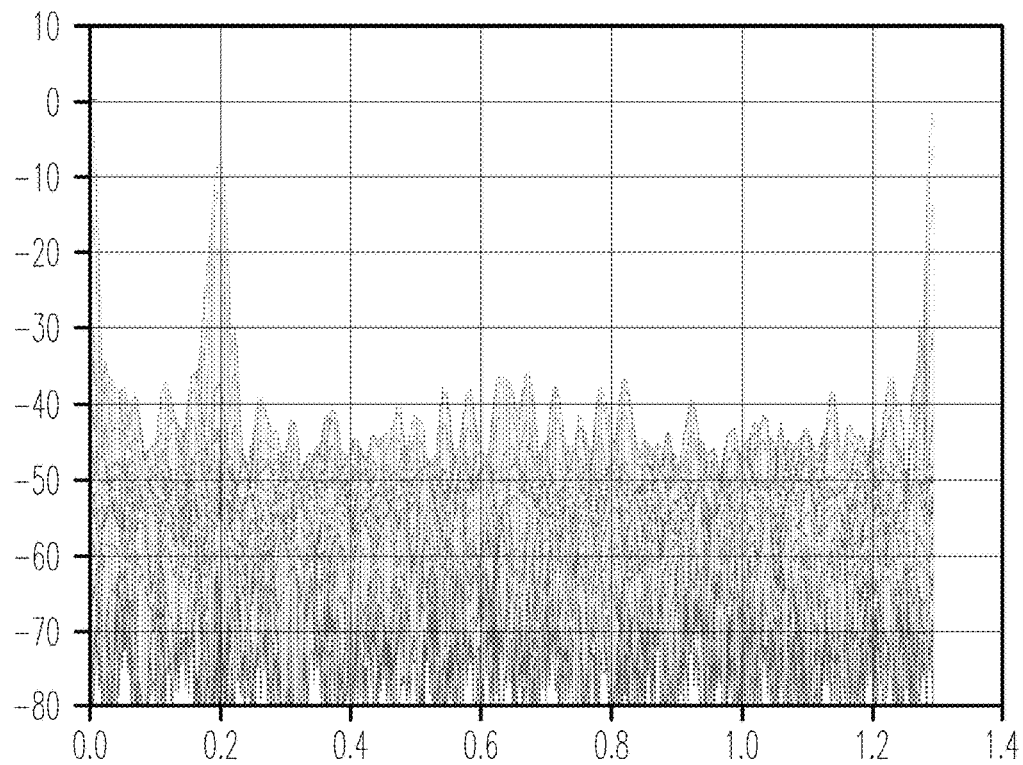
FIG. 18a is a 2D-(FFT) spectrum for the crossed path of the first radar module, with corrections for drift and jitter as well as time and frequency offset as well as phase variations, wherein the horizontal axis indicates a velocity in meters per second, and the vertical axis indicates a magnitude in decibels (dB)
Figure 18B:
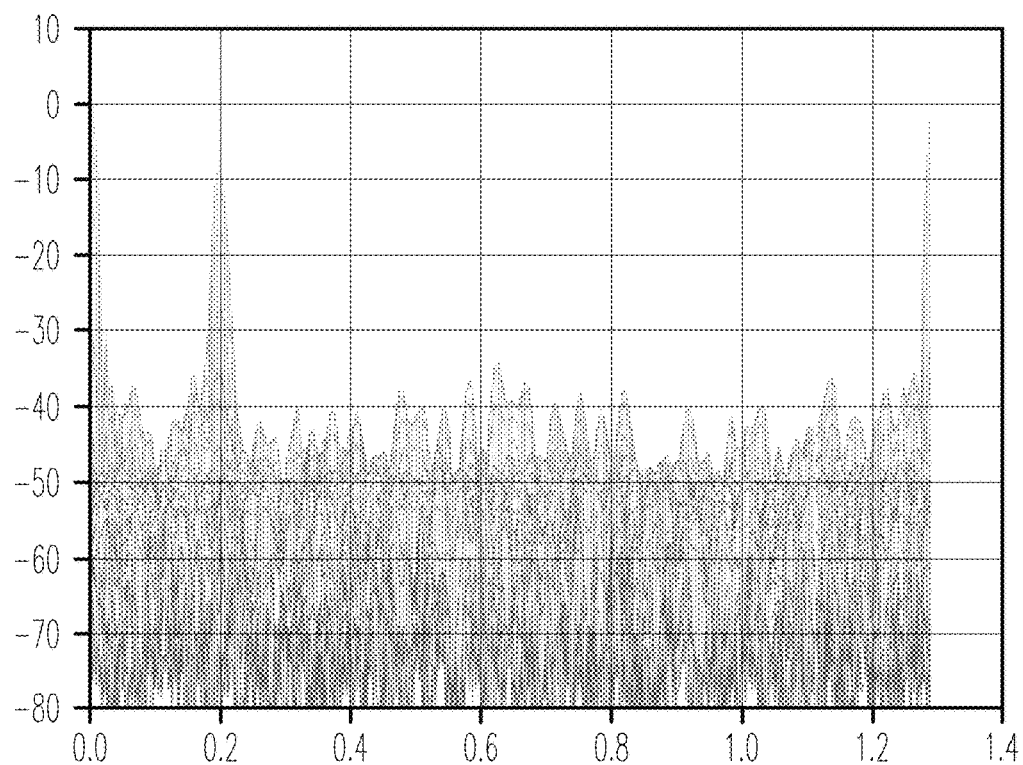
FIG. 18b is a 2D-(FFT) spectrum for the crossed path of the second radar module, with corrections for drift and jitter as well as time and frequency offset as well as phase variations, wherein the horizontal axis indicates a velocity in meters per second, and the vertical axis indicates a magnitude in decibels (dB)
Figure 19:
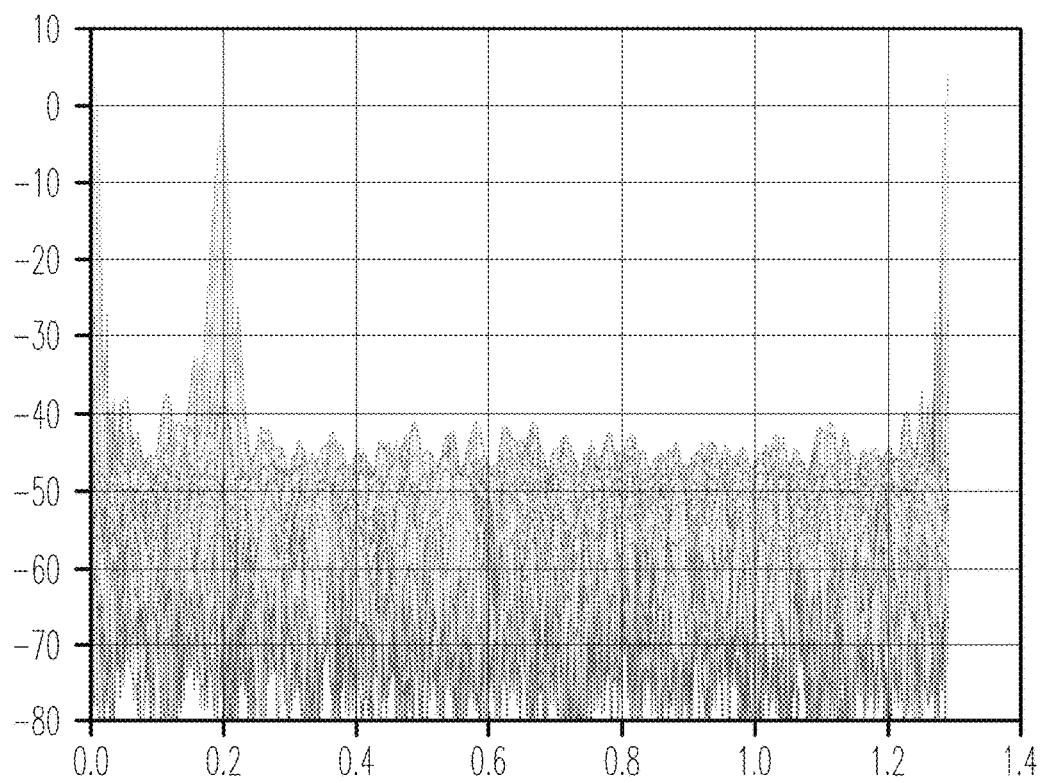
Figure 20A:
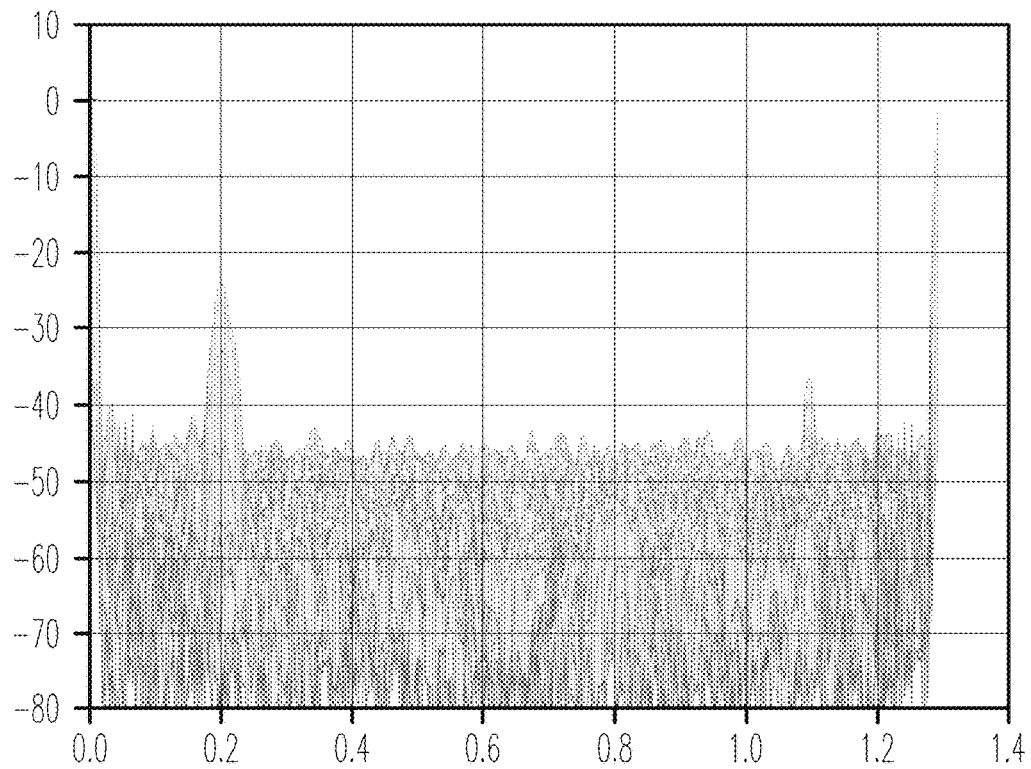
Figure 20B:
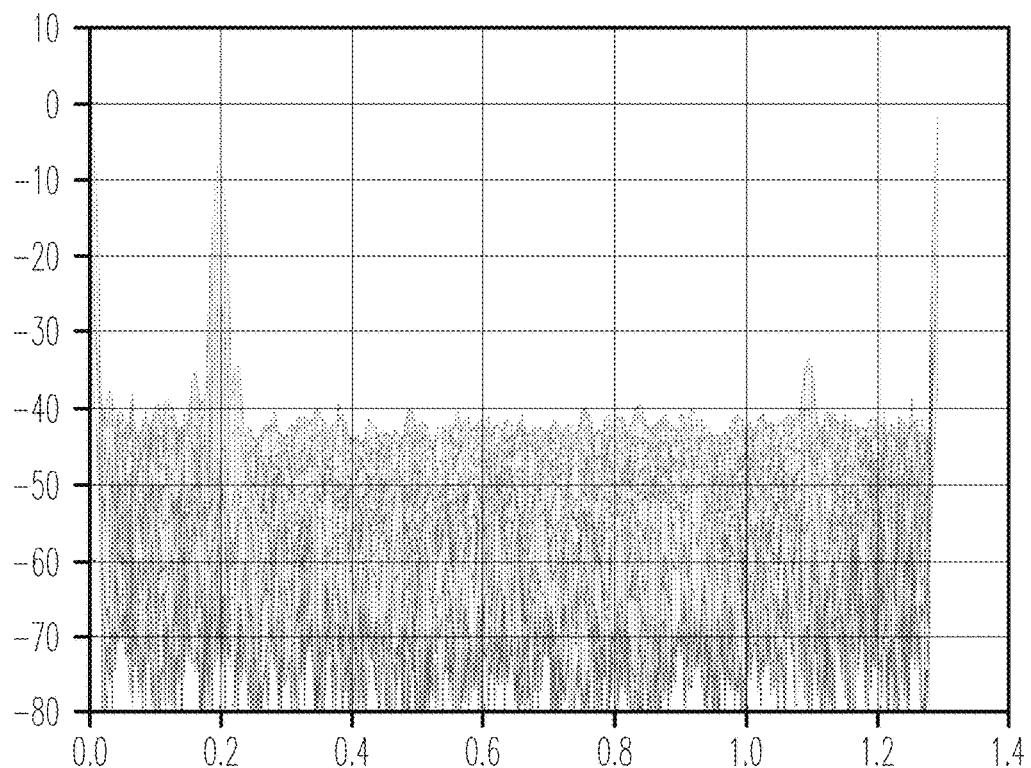

FIG. 19 is a superposition spectrum after an addition of spectra according to FIGS. 18a, 18b for the crossed path, wherein the horizontal axis indicates a velocity in meters per second, and the vertical axis indicates a magnitude in decibels (dB); and FIG. 20a is a spectrum of a primary response for the first radar module, wherein the horizontal axis indicates a velocity in meters per second, and the vertical axis indicates a magnitude in decibels (dB);

FIG. 20b is a spectrum of a primary response for the second radar module, wherein the horizontal axis indicates a velocity in meters per second, and the vertical axis indicates a magnitude in decibels (dB).

Figure 1:
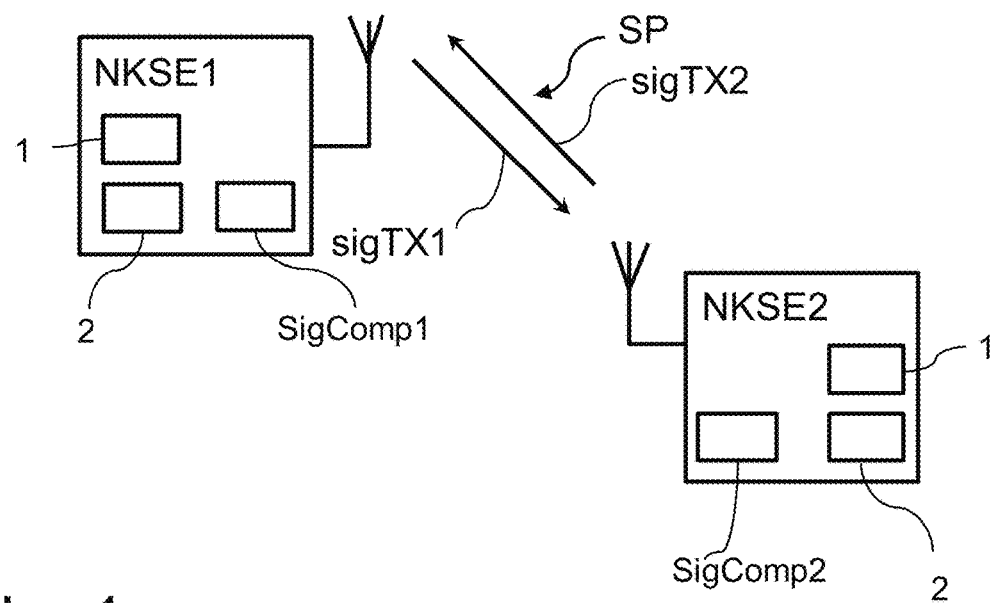
FIG. 1 are two transmitter-receiver units that communicate with each other, and individual components thereof.

As evident from FIG. 1, two transmitter-receiver units NKSE1, NKSE2 communicate with each other via a radio interface. A first or a second signal sigTX1, sigTX2 are here transmitted. The transmitter-receiver units NKSE1, NKSE2 each have a signal source 1, a unit for clock adjustment or comparison signal modification 2, and a transmission comparison unit (SigComp1, SigComp2). The (non-coherent) transmitter-receiver units are preferably comprised of radar modules. In the following, NKSE1 can thus be regarded as a first radar module, and NKSE2 as a second radar module below.

Figure 2:
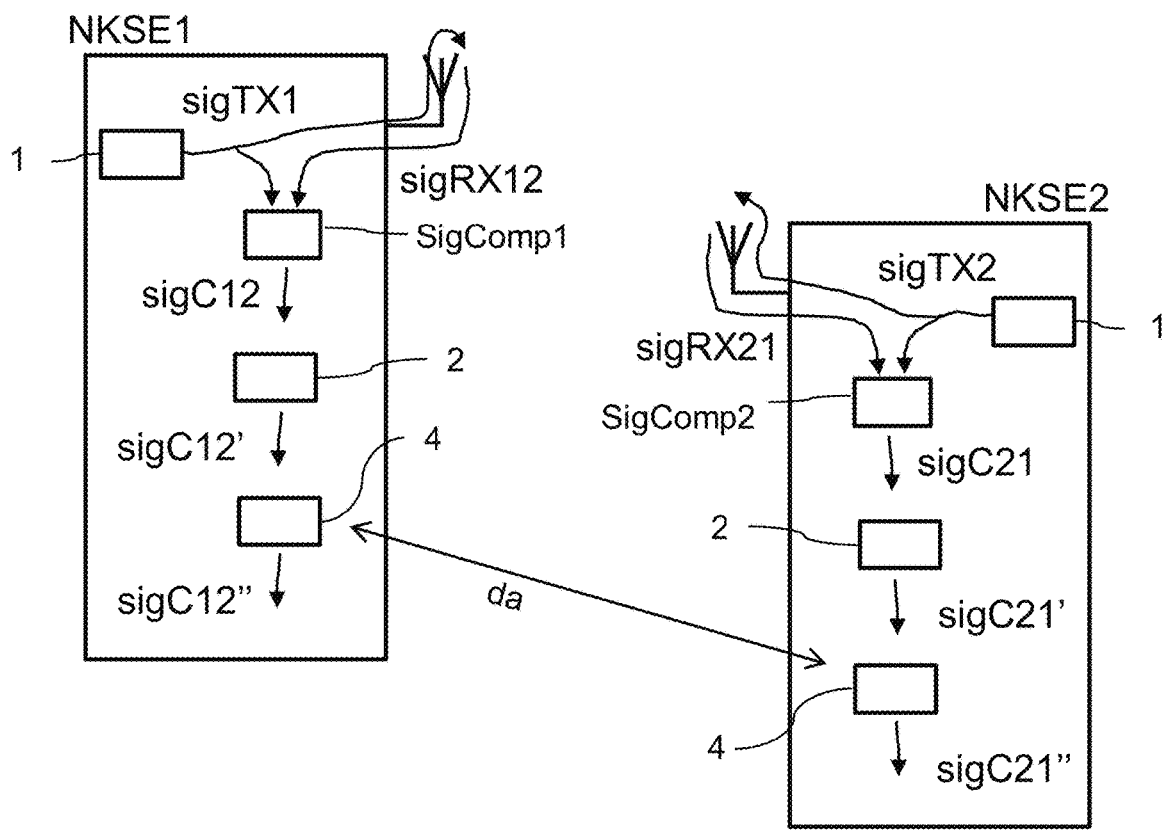
FIG. 2 are the components from FIG. 1, with illustration of a process sequence.
Figure 3:
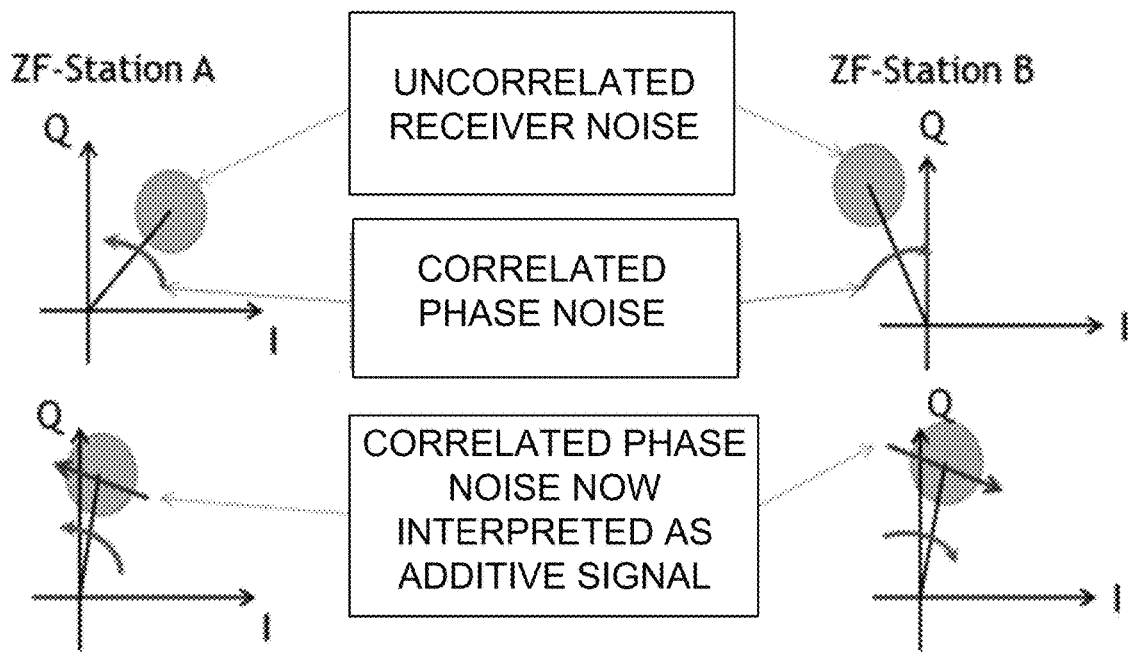
FIG. 3 are beat signals of the two transmitter-receiver units with non-correlated noise portions prior to synchronization (top) and a synthetic mixed product with correlated phase noise after synchronization (bottom)

FIG. 2 additionally shows a respective unit for phase modification 4. Data is exchanged between the two units for phase modification 4.

In the following, the exact mathematical derivation of how method II functions will be performed. In a first non-coherent transmitter-receiver unit (NKSE1), a first signal (sigTX1) is generated and transmitted, in particular emitted, over a path (SP). In an additional, in particular second non-coherent transmitter-receiver unit (NKSE2), a second signal (sigTX2) is generated and transmitted, in particular emitted, over the path (SP). The signals are here ideally emitted simultaneously, or at the very least synchronized with each other in such a way that the two signal forms preferably overlap at least half the transmission time. The signal sources can be completely or partially independent.

As usually the case in communications engineering, the used transmitted signals (sigTX1, sigTX2) can be represented as a separation into an equivalent baseband signal (bbTX1) and a carrier signal.

Since the system according to the invention is preferably to be used for distance measurement or imaging, signals with so-called good correlation properties are preferably used as the baseband signals. For example, signals with good correlation properties include broadband pulses, noise signals, pseudo-random pulse sequences (PN code) such as M-sequences, Gold codes or Barker codes, Kasami sequences, Huffman sequences, chirps, linearly frequency modulated signals (FMCW), chirp or FMCW sequences, etc. Signal forms like these have been known in radar engineering and communications engineering (in particular in the CDMA area) for a long time and in a wide variety.

The transmitted signal (sigTX1) of the transmitter-receiver unit (NKSE1) can be represented as follows:

$$sigTX1(t) = Re\{bbTX1(t-T_{01}) \cdot e^{j(\omega_{c1}(t-T_{01})+\phi TX1(t-T_{01}))}\}$$

The time offset T01 defines the transmission time of signal sigTX1;

The phase term $\phi TX1(t) = \varphi TX1 + \xi TX1(t)$ comprises a constant phase offset and the phase noise of the carrier signal.

The angular frequency $\omega_{c1}$ characterizes the frequency of the carrier signal of sigTX1.

The transmitted signal (sigTX2) of the transmitter-receiver unit (NKSE2) can be formed in the same way. The following applies:

$$sigTX2(t) = Re\{bbTX2(t-T_{02}) \cdot e^{j(\omega_{c2}(t-T_{02})+\phi TX2(t-T_{02}))}\}$$

The transmitted signals (sigTX1 and sigTX2) arrive at the respective other transmitter-receiver station, either directly or reflected by objects, and are there received and further processed as received signals sigRX12 and sigRX21.

The received signal that is received at the second non-coherent transmitter-receiver unit (NKSE2) corresponds to the transmitted signal (sigTX1), but the latter has been altered in amplitude and delayed by transit time $\tau_{21}$. In order to simplify the mathematical representation and without limiting the general disclosure, all signals are to be represented below as complex valued signals. Therefore, the following applies:

$$sigRX21(t) = ARX21 \cdot bbTX1(t-T_{01}-\tau_{21}) \cdot e^{j(\omega_{c1}(t-T_{01}-\tau_{21})+\phi TX1(t-T_{01}-\tau_{21}))}$$

If the transmitted signal (sigTX1) is transmitted on several (a number of l) transmission paths of varying length to the second transmitter-receiver unit (NKSE2), the received signal can be represented as a linear superposition of amplitude-weighted and time-delayed signals as follows:

$$sigRX21(t) = \sum_{i=1}^{l} sigRX21i(t)$$

with $$sigRX21i(t) = ARX21i \cdot bbTX1(t-T_{01}-\tau_{21i}) \cdot e^{j(\omega_{c2}(t-T_{01}-\tau_{21i})+\phi TX1(t-T_{01}-\tau_{21i}))}$$

Accordingly, the following applies to the signal transmitted from the second transmitter-receiver unit (NKSE2) to the first transmitter-receiver unit (NKSE1):

$$sigRX12(t) = ARX12 \cdot bbTX2(t-T_{02}-\tau_{12}) \cdot e^{j(\omega_{c2}(t-T_{02}-\tau_{12})+\phi TX2(t-T_{02}-\tau_{12}))}$$

or $$sigRX12(t) = \sum_{i=1}^{l} sigRX12i(t)$$

with $$sigRX12i(t) = ARX12i \cdot bbTX2(t-T_{02}-\tau_{12i}) \cdot e^{j(\omega_{c2}(t-T_{02}-\tau_{12i})+\phi TX2(t-T_{02}-\tau_{12i}))}$$

The transmitter-receiver units (NKSE1, NKSE2) were designed in such a way as to comprise signal comparison units SigComp1, SigComp in which the respective received signal of a transmitter-receiver unit is offset with its transmitted signal—i.e., signal sigRX12 with signal sigTX1 in NKSE1 and signal sigRX21 with signal sigX2 in NKSE2. The signal comparison units SigComp1, SigComp2 are designed as mixers Mix in the exemplary embodiment. That is to say, signal sigRX12 is here mixed with signal sigTX1 in NKSE1, and signal sigRX21 with signal sigTX2 in NKSE2. As generally known as such, a mixing process can be expressed in terms of system theory as multiplication, or a downmixing given two complex sinusoidal signals as the multiplication of one of the signals by the conjugated complex (*=conjugation sign) of the other signal. Therefore, the following applies:

$$\begin{aligned}sigC12 &= sigRX12^* \cdot sigTX1 \\ &= ARX12 \cdot bbTX2^*(t-T_{02}-\tau_{12}) \cdot \\ &\quad e^{-j(\omega_{c2}(t-T_{02}-\tau_{12})+\phi TX2(t-T_{02}-\tau_{12}))} \cdot \\ &\quad bbTX1(t-T_{01}) \cdot \\ &\quad e^{j(\omega_{c1}(t-T_{01})+\phi TX1(t-T_{01}))} \\ &= ARX12 \cdot bbTX2^*(t-T_{02}-\tau_{12}) \cdot \\ &\quad bbTX1(t-T_{01}) \cdot \\ &\quad e^{j(\omega_{c1}(t-T_{01})+\phi TX1(t-T_{01})-\omega_{c2}(t-T_{02}-\tau_{12})-\phi TX2(t-T_{02}-\tau_{12}))}\end{aligned}$$

In another advantageous way of forming a comparison signal, NKSE1 does not mix signal sigRX12 with signal sigTX1, but instead only with its carrier. That is to say:

$$\begin{aligned}siC12 &= sigRX12^* \cdot e^{j(\omega_{c1}(t-T_{01})+\phi TX1(t-T_{01}))} \\ &= ARX12 \cdot bbTX2^*(t-T_{02}-\tau_{12}) \cdot \\ &\quad e^{j(\omega_{c1}(t-T_{01})+\phi TX1(t-T_{01})-\omega_{c2}(t-T_{02}-\tau_{12})-\phi TX2(t-T_{02}-\tau_{12}))}\end{aligned}$$

The following applies accordingly for the signals in the NKSE2:

$$\begin{aligned}sigC21 &= sigRX21^* \cdot sigTX2 \\ &= ARX21 \cdot bbTX1^*(1-T_{01}-\tau_{21}) \cdot\end{aligned}$$

-continued
$$e^{-j(\omega_{c1}(t-T_{01}-\tau_{21})+\phi TX1(t-T_{01}-\tau_{21}))} \cdot$$
$$bbTX2(t-T_{02}) \cdot$$
$$e^{j(\omega_{c2}(t-T_{02})+\phi TX2(t-T_{02}))}$$
$$= ARX21 \cdot bbTX1^*(t-T_{01}-\tau_{21}) \cdot$$
$$bbTX2(t-T_{02}) \cdot$$
$$e^{j(\omega_{c2}(t-T_{02})+\phi TX2(t-T_{02})-\omega_{c1}(t-T_{01}-\tau_{21})-\phi TX1(t-T_{01}-\tau_{21}))}$$

Or in the alternative embodiment:

$$sigC21 = sigRX21^* \cdot e^{j(\omega_{c2}(t-T_{02})+\phi TX2(t-T_{02}))}$$
$$= ARX21 \cdot bbTX1^*(t-T_{01}-\tau_{21}) \cdot$$
$$e^{j(\omega_{c2}(t-T_{02})+\phi TX2(t-T_{02})-\omega_{c1}(t-T_{01}-\tau_{21})-\phi TX1(t-T_{01}-\tau_{21}))}$$

It is now assumed that means are provided in NKSE for ensuring that the following conditions are satisfied:

$$T_{01}=T_{02}=T_0 \text{ und } \omega_{c2}=\omega_{c1}=\omega_c$$

How these means can preferably be configured was already described above, or has yet to be described further below in an exemplary embodiment. Under these boundary conditions:

$$sigC12 = ARX12 \cdot bbTX2^*(t-T_0-\tau_{12}) \cdot$$
$$bbTX1(t-T_0) \cdot$$
$$e^{j(\omega_c(t-T_0)+\phi TX1(t-T_0)-\omega_c(t-T_0-\tau_{12})-\phi TX2(t-T_0-\tau_{12}))}$$
$$= ARX12 \cdot bbTX2^*(t-T_0-\tau_{12}) \cdot$$
$$bbTX1(t-T_0) \cdot$$
$$e^{j(\omega_c\tau_{12}+\phi TX1(t-T_0)-\phi TX2(t-T_0-\tau_{12}))}$$

$$sigC21 = ARX21 \cdot bbTX1^*(t-T_0-\tau_{21}) \cdot$$
$$bbTX2(t-T_0) \cdot$$
$$e^{j(\omega_c(t-T_0)+\phi TX2(t-T_0)-\omega_c(t-T_0-\tau_{21})-\phi TX1(t-T_0-\tau_{21}))}$$
$$= ARX21 \cdot bbTX1^*(t-T_0-\tau_{21}) \cdot$$
$$bbTX2(t-T_0) \cdot$$
$$e^{j(\omega_c\tau_{21}+\phi TX2(t-T_0)-\phi TX1(t-T_0-\tau_{21}))}$$

Assuming a reciprocal transmission channel, the following also applies:

$$\tau_{21}=\tau_{12}=\tau$$

In the next step, data communication is used to ensure that both comparison signals are transmitted to a shared evaluation unit, and that both are there present for evaluation. The shared evaluation unit can be NKSE1, NKSE2 or another evaluation unit.

In another processing step, the phases of the two comparison signals are now added. If only the carder phases with the phase noise portion are here considered, since unknown phase contributions are present only in this portion, and the two carrier phase terms are added, then:

$$\Delta\phi = (\omega_c\tau + \phi TX1(t-T_0) - \phi TX2(t-T_0-\tau)) +$$
$$(\omega_c\tau_{21} + \phi TX2(t-T_0) - \phi TX1(t-T_0-\tau_{21}))$$

-continued
$$= 2\omega_c\tau + \phi TX1(t-T_0) - \phi TX1(t-T_0-\tau) +$$
$$\phi TX2(t-T_0) - \phi TX2(t-T_0-\tau)$$

Taking into account that the transit time $\tau$ is as a rule very small due to the high propagation velocity of electromagnetic waves, and that the relevant phase noise portions typically drop off sharply in an oscillator based on the known correlations of oscillator phase noises as the distance from the carrier increases, and $\phi TX1$ or $\phi TX2$ resultantly exhibit a pronounced low-pass behavior, specifically a low-pass behavior with a cut-off frequency that is usually significantly less than $1/\tau$, it follows that:

$$\delta\phi 1(t) = \phi TX1(t-T_0) - \phi TX1(t-T_0-\tau) \text{ with } \delta\phi 1(t) \ll \phi TX1(t)$$

$$\delta\phi 2 = \phi TX2(t-T_0) - \phi TX2(t-T_0-\tau) \text{ with } \delta\phi 2(t) \ll \phi TX1(t)$$

The proposed processing, in which the phase of the respective other comparison signal is added up for one of the comparison signals, thus results in a very significant reduction in the disturbances caused by phase noises. This reduction in phase noises leads to a better detectability of targets, a larger measuring range and an improved measuring accuracy.

Depending on the selected mixer topology, e.g., on whether an identical position or inverted position mixer is used, it is possible for the phase terms represented above to have different signs. Depending on the sign, the preferred linkage for the phase terms is not invariably an addition, but potentially also a subtraction. The key factor is that the linkage lead to a reduction in the phase noise terms and transit time dependent phase term, i.e., that an expression comprising the term $\omega_c\tau$ be retained. It is further generally known that, in a case where the phase values are represented by complex numbers, the complex numbers are multiplied and divided with each other, or multiplied with the conjugated complex of the respective other number, so as to form the sum or difference of phases.

One possible preferred variant for reducing the phase noise portions will be described below. In many cases, it is favorable that identical baseband signals be generated in the first and second non-coherent transmitter-receiver unit (NKSE1, NKSE1), i.e., that the following applies:

$$bbTX1=bbTX2=bbTX.$$

In an at least approximatively reciprocal radio channel, it must further be assumed that the following applies:

$$ARX12=ARX21=ARX.$$

Under these boundary conditions, the result is:

$$sigC12=ARX \cdot bbTX^*(t-T_0-\tau_{12}) \cdot bbTX(t-T_0) \cdot$$
$$e^{j(\omega_c\tau+\phi TX1(t-T_0)-\phi TX2(t-T_0-\tau))}$$

$$sigC21=ARX \cdot bbTX^*(t-T_0-\tau_{21}) \cdot bbTX(t-T_0) \cdot$$
$$e^{j(\omega_c\tau+\phi TX2(t-T_0)-\phi TX1(t-T_0-\tau))}$$

As readily discernible, the two signals are identical except for their phase terms.

However, despite a reciprocal radio channel, easily distinguishable amplitudes for signals sigC12 and sigC21 can arise due to varying properties of the electronic components, e.g., mixers or amplifiers, etc. If the amplitudes of signals sigC12 and sigC21 differ, the signals must first be standardized to the same amplitude in the preferred variant described here.

Additional systematic phase offsets can also arise during the process for forming signals sigC12 and sigC21. If these phase offsets of signals sigC12 and sigC21 differ, these phase offsets must first be compensated in the preferred variant described here.

Signals sigC12 and sigC21 can be viewed as a complex pointer for a specific time t. A complex addition of pointers cancels out the vector components of the phase terms with differing sign in the same way as described above for the addition of phase terms. As one possible preferred variant for reducing the phase noise portions, it is thus proposed that complex signals sigC12 and sigC21 be added, i.e., that a signal be formed as follows:

$$sigCC=sigC12+sigC21$$

Signal sigCC then has a significantly lower phase noise than signal sigC12 or sigC21, and signal sigCC is then further used for distance measurement, angle measurement or imaging purposes. Prior to the addition of signals, however, it is important to compensate for the systematic deviations of amplitudes and phases described above, which lead to varying carrier frequencies and transmission times.

Of course, it is not necessary to add up all values for sigC12 and sigC21, and not even necessarily the signals sigC12 and sigC21 themselves. However, at least one complex value comprised of a first of the two comparison signals or of a signal derived from this first comparison signal is to be used to adjust at least one complex value of the second of the two comparison signals or a value of a signal derived from this second comparison signal, so as to thereby form at least one value of a signal (sigCC), wherein the adjustment takes place in such a way that a mathematical operation forms the vectorial sum or the difference of at least two complex values derived from sigC12 and sigC21, or forms the sum or the difference of the phases of these complex values.

Let it be noted here that the proposed mixing processes only represent one possible embodiment, and that the phase noise portions could also be compensated using alternative methods. For example, all high frequency signals could already be digitized prior to mixing, i.e., scanned with an analog-to-digital converter, and all other operations could take place computationally or digitally, for example in a processor FPGA (field programmable gate array).

The transmitted signals sigTX1 and sigTX2 can basically be FMCW modulated. The spectra of the comparison signals are here preferably standardized to the highest value (prior to the mathematical operation).

A special embodiment of method II with FMCW signals and several sequential N ramps will be described below. The NKSE's here transmit several N signals with a linearly rising or falling frequency, referred to below as frequency ramps. The comparison signals are then generated out of the received signals in the NKSE, and then temporarily stored for further processing. Rising and falling ramps are used as an example, since this makes it possible to determine the relative velocity with the correct sign.

Figure 4:
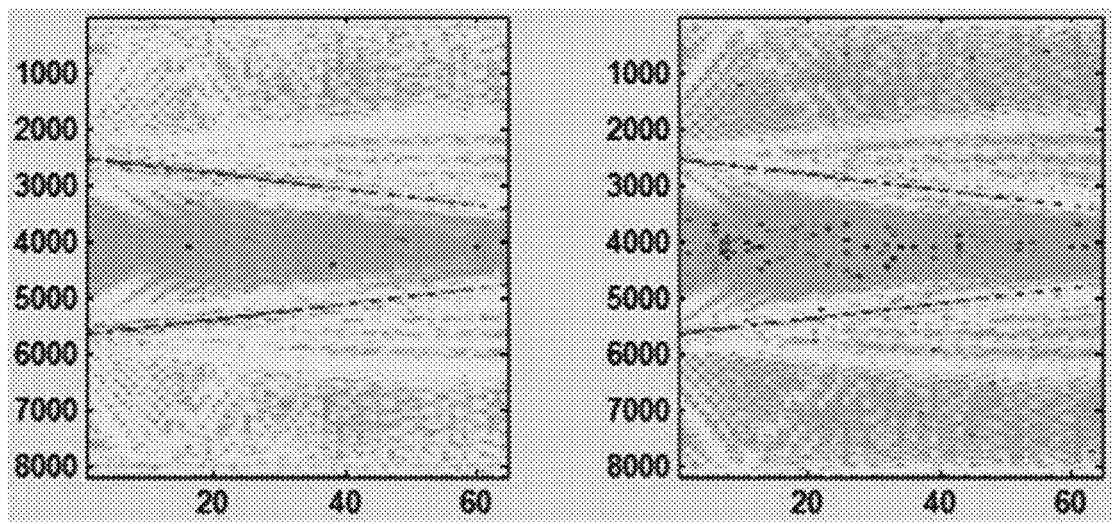
FIG. 4 are spectrograms of all ramps from the two transmitter-receiver units prior to synchronization.

Individual spectrograms of beat signals sigC12 and sigC21 are first generated for each reception channel for each ramp. These spectrograms are juxtaposed for all N sequential ramps in an amplitude display without phase information. This is depicted on FIG. 4 for the rising ramps, in which two maxima appear, since no IQ mixing was performed, with a real-valued scanning signal being present instead. During use in primary radars, the at least one reflector in the detection area must be identified for this step, and depicted as described above.

The frequency band in which the beat signal is to be expected (ensured via rough synchronization) is now generously cropped. The respective spectrogram of the first N/2 ramps is then correlated with that of the second N/2 ramps along the frequency axis (step 1). The maximum found in the process reflects the relative time drift of the two NKSE's (a linear function can here be assumed). For example, when receiving the signals via one or several reflections, the targets can also be identified via the opposing drift on both sides.

In particular in the case of primary radars, the frequency offset can alternatively also be determined via a shared bus system, by having the systems exchange their measurement signals or further synchronization signals via the cable of a bus system. The bus system is here in particular a CAN, FlexRay, Most, gigabyte ethernet system, USB, Firewire or TTP system.

All ramps in the spectrogram are then corrected by this drift, for example by multiplying with a complex correction signal with opposing frequency offset in the unit for clock adjustment or comparison signal modification 2. The spectrograms of the various ramps obtained in this way are (incoherently) added, and the maximum corresponding to the time delay (offset error) is searched for in the superposition result. In the case of primary radar, the peaks can be selected using the identification in the preceding step of peaks that belong together.

Alternatively, the time offset can also be determined by way of a shared bus system, in particular by transmitting either the measurement data or suitable correlation sequences.

The parameters for relative time delay and relative time drift (=current frequency offset) determined in this way are averaged over the entire sequence of N ramps. This result contains a large part of the clock deviation. In addition, at what location in the spectrogram the respective energy of the incoming signal is to be expected is now known for each ramp and each station.

The originally recorded local mixed signals sigC12 and sigC21 are now first displaced by integral values Tint (the time delay between the two stations represented as $\Delta T=|T01-T02|=Tint+Tfrac$), so as to obtain a uniform time basis. The phase noise is more strongly correlated owing to the shared, precise time basis. The remaining, slight time error Tfrac can now be compensated for, e.g., by using a fractional delay filter. The signals displaced in this way are now corrected by the deviating ramp slope, which arises due to the frequency offset $\Delta\omega=\omega1-\omega2$ of the two local oscillators, by folding or spectrally multiplying with a standardized, complex correction signal, which images the frequency progression in the opposite direction.

After an FFT of the beat signal to the channel impulse response, a search is performed for a peak in these further refined mixed signals. In the case of secondary radar, the strongest peak or alternatively the first peak is preferably taken, while a peak contained equally on both sides must be selected for primary radar. In this way, a maximum arises for each ramp at both stations at the estimated distance with the accompanying phase position. In principle, these values coincide with each other for the measurement on the outward and return path given a reciprocal channel. The remaining deviations can be attributed to remaining frequency and phase differences between both signal sources 1 of the NKSE, for example of the oscillators, the underlying cause for which is phase noise. The exact frequency difference can now be absolutely determined, and thus corrected (the phase difference can be determined up to a 180° ambiguity (360° for IQ mixers)). This ambiguity is eliminated by limiting the phase progression to +/−90° from ramp to ramp, which is also referred to as unwrapping. After this precise correction of the remaining phase error, there exists hardly any difference between the synthetic mixed signals of both stations.

After this preliminary processing, the characteristic, systematic errors of the radar system were completely corrected, as a result of which the phase shift of the two beat signals now only deviates by a small amount. At this juncture, a precise synchronization of the time and frequency basis has been achieved on the one hand, and the phase noise can be regarded as an additive contribution and eliminated through linear combination on the other. For example, this is done via the 2D Fourier transformation of all N-ramps on both NKSE's, whereupon the amplitude-standardized beat signals are finally added together. With the inclusion of the system parameters (sampling rate, ramp slope, carrier frequency, ... ), the maximum of the result for this linear combination represents the estimated value for distance and velocity.

FIG. 5 schematically depicts a configuration of a plurality of radar modules RM 1, RM 2, ... RM N, which each have a device for frequency generation (HF-generator) 11, a device 12 for frequency conversion as well as an (optional) device 13 for clock generation and an (optional) device 14 for AD conversion.

FIG. 6 shows examples for how the radar modules depicted schematically on FIG. 1 can be arranged on a motor vehicle (automobile). On FIG. 6a, four radar modules are arranged on the motor vehicle (front left, front right, rear left and rear right). As a result, the surroundings can be especially advantageously captured (with four sensors in the present case). Three radar modules are arranged in the front (none in the rear in this case) on FIG. 6b, specifically front left, front center and front right. As a result, the surroundings can be especially advantageously captured in the traveling direction (with three sensors in the present case). On FIG. 6c, the surroundings can be captured especially comprehensively, in the present case with eight radar modules (front left, front center, front right, rear left, rear center, rear right and a respective radar module on the two sides).

Figure 7:
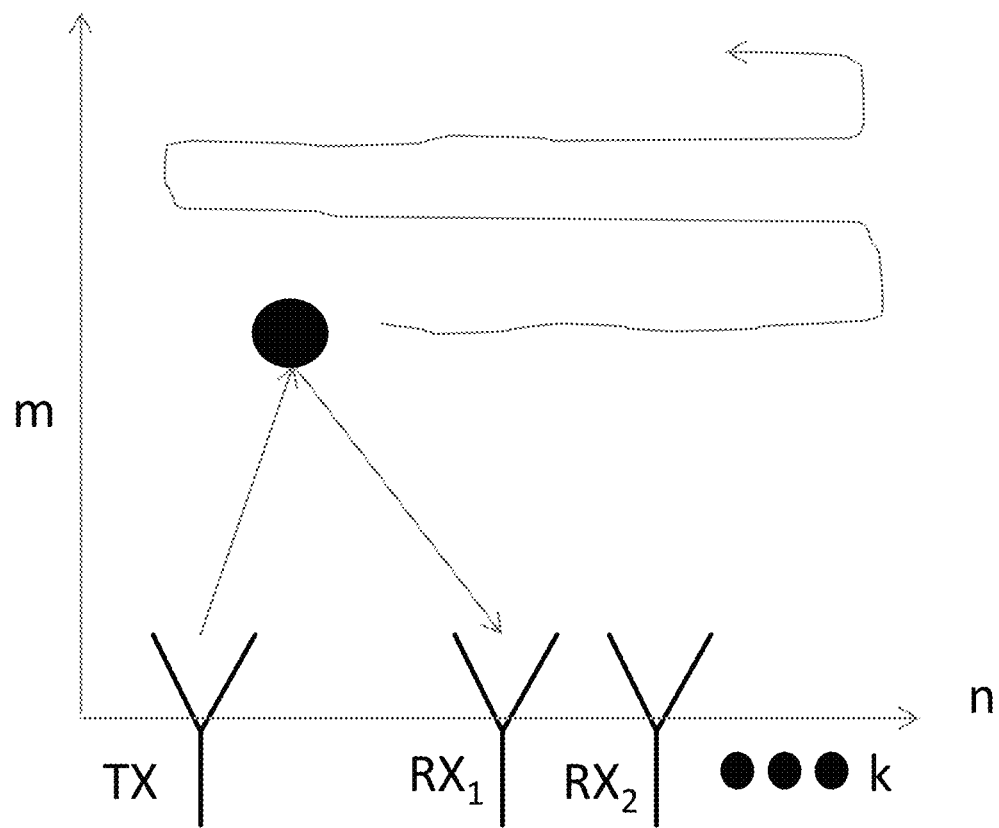
FIG. 7 is a diagram concerning a holographic evaluation.

An embodiment for a holographic evaluation will be described below, drawing reference to FIG. 7. For the present application, the holographic calculation can be performed as follows.

A space to be calculated can be represented by individual points in space. The configuration of the transmitter and receiver antennas in the space to be calculated or relative to the space to be calculated is (usually) known. A synthetic signal (amplitude, phase, frequency) that arises for a propagation path (from an assumed transmitter antenna a to an assumed receiver antenna b) can be calculated for each point in space. This signal can then be correlated with real measurement data for this transmission path, and the complex correlation result can be recorded for this point in space. The process can be repeated for all k propagation paths for a point in space, and respectively (complexly) added to the result of the preceding calculation. An amount value for this sum then represents an allocation probability for the point in space. This process can be repeated over all n, m points in space, and the radar image can thus be generated.

In particular when using FMCW signals, the holographic process can be performed as follows:

A beat spectrum can first be calculated for each channel. A signal hypothesis relating to the phase position for each transmitted signal-received signal combination can be set up for each point in space in such a way as to correspond with an expected phase shift on this propagation path (from an assumed transmitter antenna a to an assumed receiver antenna b). An expected phase location can be correlated with a staring frequency $f_u$ and a signal path length d of an FMCW system according to $\varphi_H = \exp(j2\pi d f_u/c)$. This signal hypothesis can then be multiplied (on a complexly conjugated manner) with real measurement data (a precise amplitude and phase value can be obtained from the beat spectrum through interpolation) of this transmission path, and the (complex) intermediate result for this point in space can be recorded. This procedure can be repeated for all k propagation paths for the point in space, and respectively (complexly) added to the result of the preceding calculation. An amount value for this sum then represents the allocation probability for the point in space. This process can be repeated over all n, m points in space (in the two spatial dimensions), and a radar image can thus be generated.

The holographic calculation can especially preferably also be used for calibration purposes. The correction vector that represents an ideally focused target can here be determined, in particular iteratively. When calibrating antenna arrays, use is (ideally) made of a point target in the far field that is located very far away from the configuration in distributed radar modules according to the above approximation formula. As a result, the required high signal-to-noise ratio is not reached. In addition, it is very difficult to measure the exact position of the calibration object in this case, and the configuration requires a lot of space. Selecting a suitable environment without additional reflecting objects and with little clutter is also comparatively complicated. A largely ideal point target at a known position (e.g., a metal cylinder or metal ball) in the near field is preferably used for calibration purposes (instead of an object in the far field). After the exact position of the radar configuration and the target has been determined, in particular the amplitudes can be adjusted and the phase differences (according to the above holographic approach) can be corrected.

The holographic processes can also be performed at the velocity and acceleration level. As a consequence, the velocity and acceleration vector can be (holographically) determined for each image point. For example, DE 102009030076 describes suitable velocity and acceleration holography methods.

Figure 8:
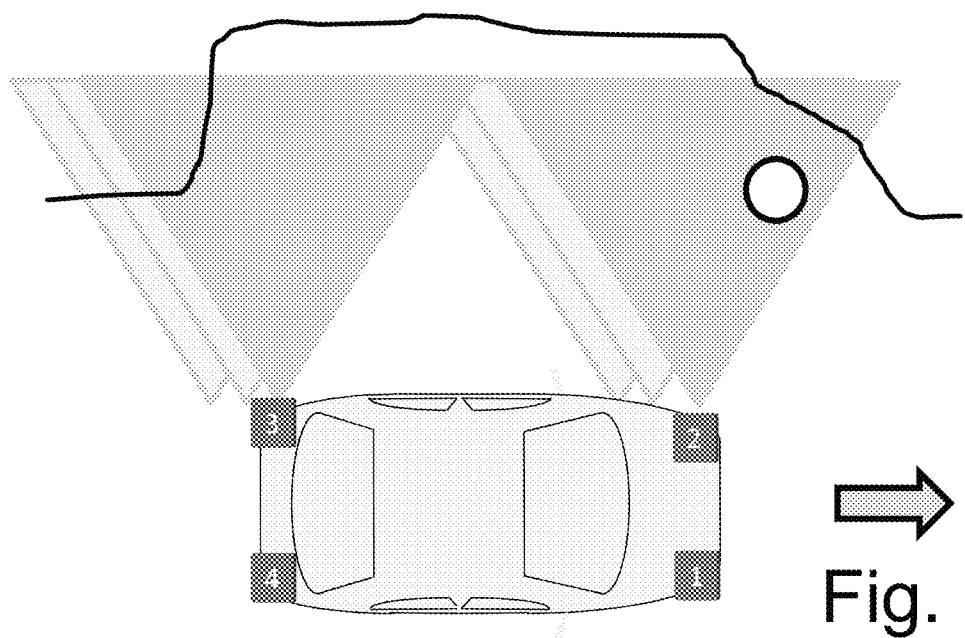
FIG. 8 is a schematic view of an SAR imaging.

SAR imaging according to the invention will be illustrated below, drawing reference to FIG. 8. Radar measurements can be performed and recorded in SAR imaging along a specific movement path. These can then be mathematically combined as though they were combined by an antenna array with elements at each location where a measurement was recorded. In prior art, radar was used for this purpose, and the synthetic aperture was generated over the entire movement length. By using two radars whose signals are coherent relative to each other, the radar data of both sensors and the additional paths between the radars can be used, and a traversing path required for illumination becomes smaller. For this reason, the radar systems whose signals are corrected via postprocessing as though they were generated by a coherent radar are advantageously mounted in a large aperture. The radar signals of both radar modules (a direct path and a crossed path or indirect path) can then be used together in an SAR algorithm.

Figure 9:
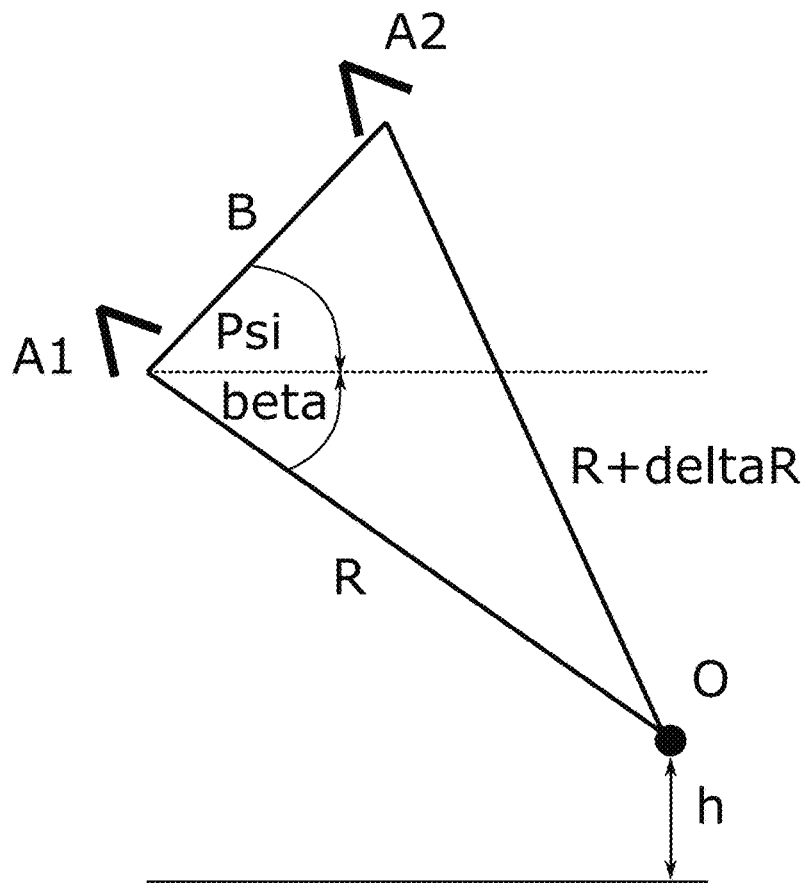
FIG. 9 is a schematic view concerning an interferometric SAR.
Figure 10:
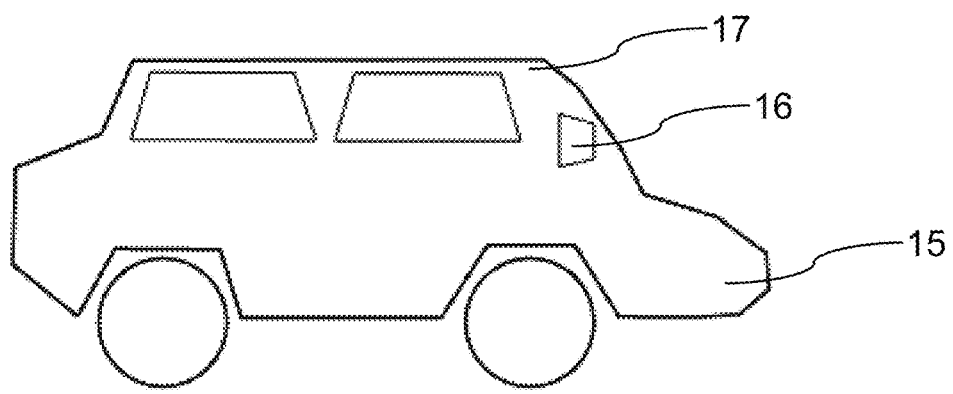
FIG. 10 is a schematic view of a vehicle with sensor array.

FIG. 9 presents a schematic sketch of an interferometric SAR (SAR-synthetic aperture radar). FIG. 10 shows a schematic vehicle with an exemplary sensor layout (layout of modules).

Measuring a height of objects poses a significant obstacle in particular in the area of autonomous driving, since currently used environment sensors (usually) only make it possible to estimate the distance, velocity and azimuth angle of a target in the vehicle environment. Known from M. A. Richards, "A Beginner's Guide to Interferometric SAR Concepts and Signal Processing", IEEE Aerospace and Electronic Systems Magazine, Vol. 22, No. 9, pages 5-29, 2007, is that a system having several spatially offset receiver antennas can be used for measuring height. In this case, the antennas of the system are downwardly inclined, wherein a directional characteristic that radiates toward the front as well as downwardly (situationally) can also be advantageous. The achievable accuracy is here significantly limited by a difference in height between the receiver antennas. A comparatively high accuracy is advantageous in particular for differentiating between objects, such as curbs, fences, reflector posts, traffic signs, manhole covers, or trash (for example, beverage containers or small packages here do not represent any significant objects on the road), which are present on the road, but also for detecting and differentiating between people or animals in traffic. In addition, height detection is (critically) significant for automatic parking processes. According to M. A. Richards, "A Beginner's Guide to Interferometric SAR Concepts and Signal Processing", IEEE Aerospace and Electronic Systems Magazine, Vol. 22, No. 9, pages 5-29, 2007, the accuracy of height measurement is determined by approximation using $$|\delta h| \approx \frac{\cos(\psi)}{\sin(\psi + \beta)} \frac{R}{B} |\delta(\Delta R)|$$

wherein the two angles $\psi$ and $\beta$, as well as the distances R, B and $\Delta R$, can be gleaned from FIG. 9. $\delta(\Delta R)$ here represents the accuracy of measurement with respect to differential distance, for example which can be determined very precisely by means of a phase comparison. In the present invention, the baseline B can be significantly increased, since additional reception elements (modules) can be positioned as desired (or at least essentially as desired) on the vehicle. For example, by placing one radar module in a bumper and a second radar module on the roof of the vehicle, this makes it possible to raise the accuracy by a factor of 10 (compared with a single, compact radar module with several reception elements). Exemplary installation positions are illustrated on FIG. 10, specifically in a bumper 15, side mirrors 16 and/or in a roof (roof rail) 17.

Methods for reducing interference components, in particular phase noises, are explained based upon the diagrams according to FIG. 11a, 11b-20a, 20b. These methods are also to be described as a further development of method I or method II as (optionally) independent subject matters of the present invention. In this conjunction, the additional features in claim 1 (as well as the other independent claims) are here possibly only optional.

To the extent modules are discussed below, these can in particular be the (non-coherent) transmitter-receiver units according to method I or method II. The modules (transmitter-receiver units) thus need not (necessarily) be arranged on a moving object (e.g., on a motor vehicle according to FIG. 8) or be configured for such a layout. However, this is possible.

Figure 11A:
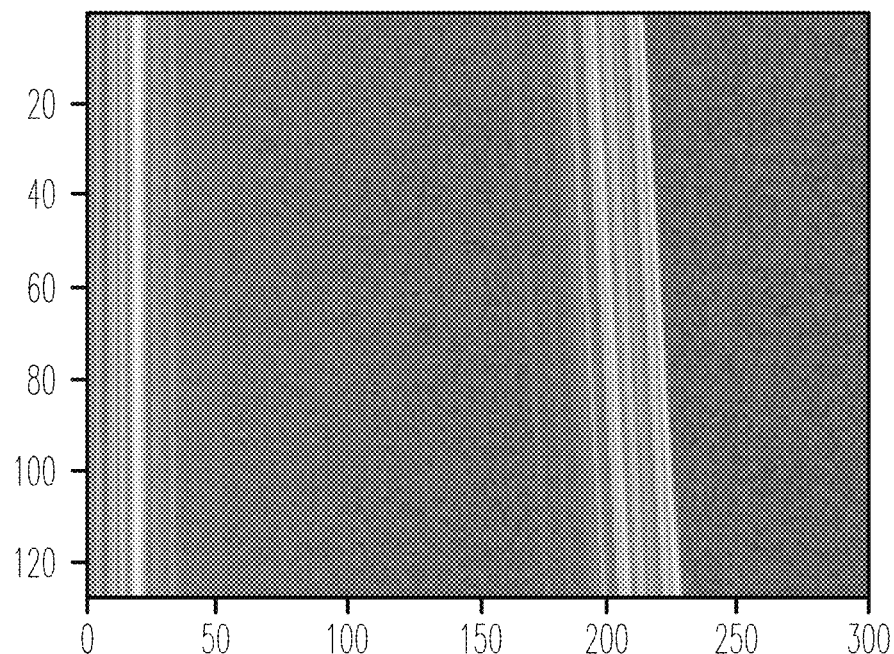
FIG. 11a is a spectrogram for the first radar module, wherein the horizontal axis indicates a distance in meters, and the vertical axis indicates a chirp or ramp number.
Figure 11B:
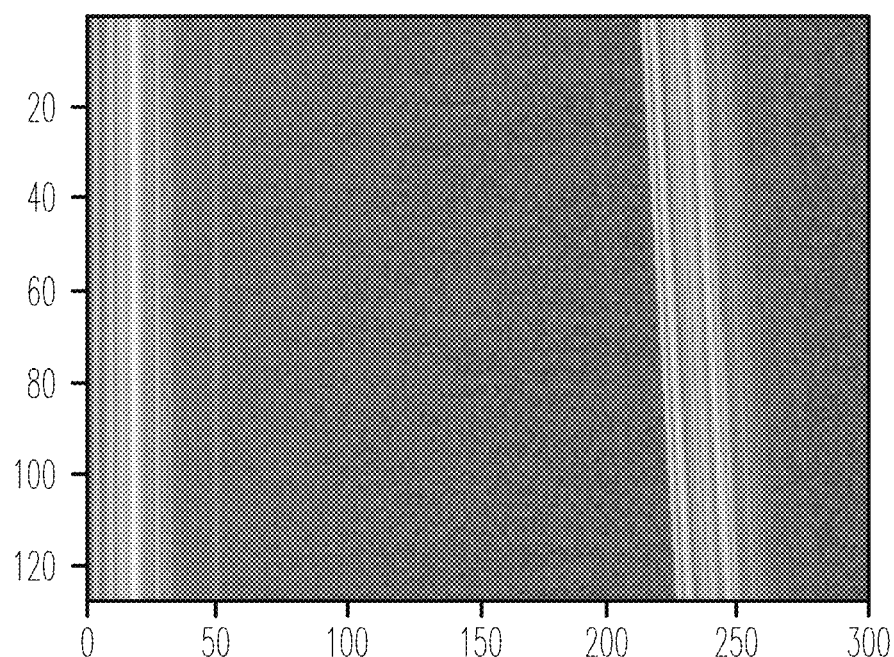
FIG. 11b is a spectrogram for the second radar module, wherein the horizontal axis indicates a distance in meters, and the vertical axis indicates a chirp or ramp number.

FIG. 11a shows a spectrum of a first radar module. Specifically prescribed is a progression of several (here for example 128) ramps, if the latter are depicted one next to each other for a transmission channel. As evident, a crossed path is influenced on the one hand by a frequency offset $\Delta f$ (here selected as 350 kHz), but also by an unknown drift $T_d$ and jitter $T_j$, in such a way that a beat frequency changes over a signal duration (i.e., for example the sequence of 128 ramps). In addition, the unknown time offset between the modules $T_{off,0}$ can possibly also have an influence. This offset is produced by the various starting points for signal generation in the radar module. This offset might not be completely known even given a pre-synchronization via the air interface or via a synchronization line. FIG. 11b shows a corresponding spectrum for a second radar module.

Figure 12A:
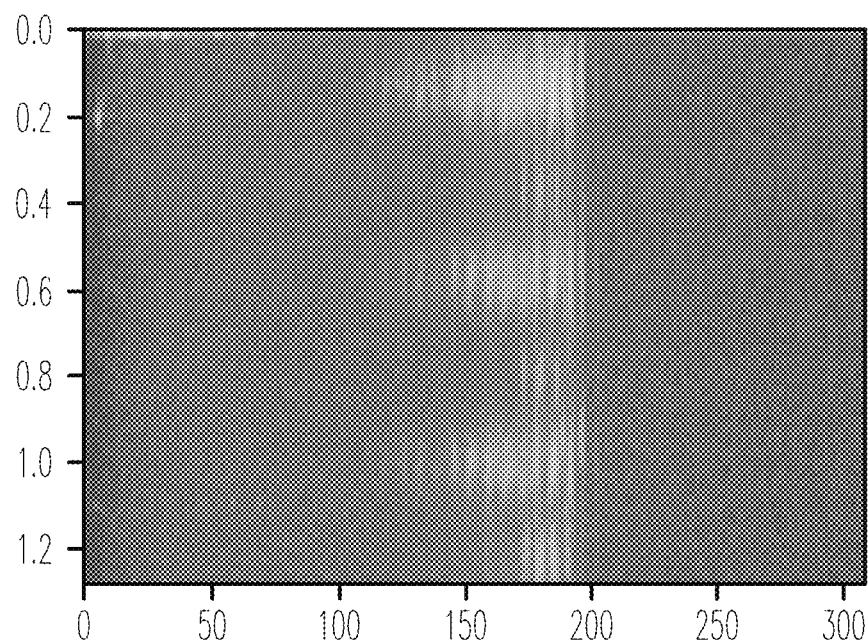
FIG. 12a is an additional spectrogram for the first radar module, wherein only a primary response was evaluated, wherein the horizontal axis indicates a distance in meters, and the vertical axis indicates a chirp or ramp number.
Figure 12B:
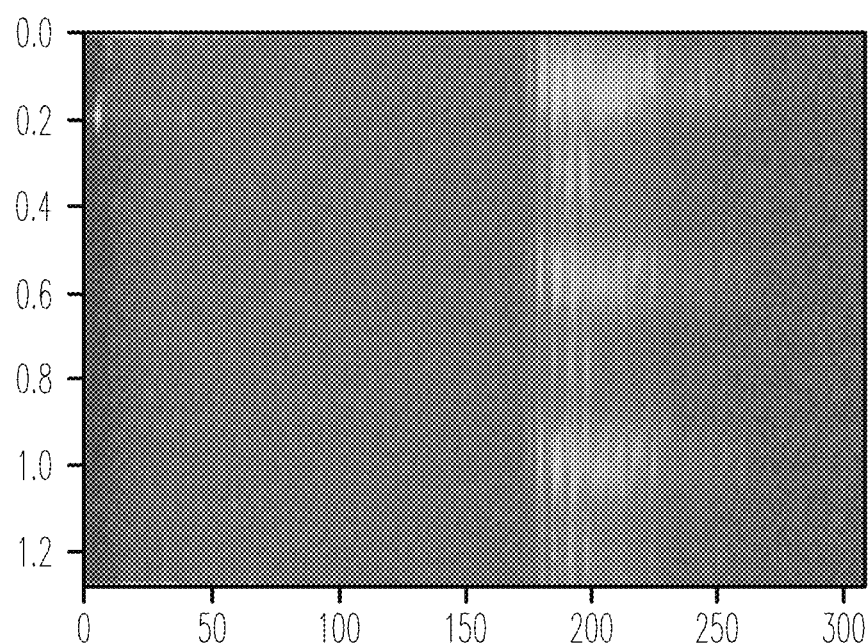
FIG. 12b is an additional spectrogram for the second radar module, wherein only a primary response was evaluated, wherein the horizontal axis indicates a distance in meters, and the vertical axis indicates a chirp or ramp number.

Evaluating (only) one primary radar response yields an illustration according to FIG. 12a (for the first radar module) and 12b (for the second radar module). These depictions stem in particular from a 2D-FFT without pre-processing.

In evidence are standing targets at v=0 m/s along with a moving target with a constant velocity of 0.2 m/s at a specific distance. A crossed path response cannot be evaluated in this way (at least not especially accurately), but can be corrected based upon the following statements (algorithms). An azimuth angle can further be drawn upon for a (complete) evaluation.

Crossed path signals of the (two) radar modules after a mixing process, being influenced by (all) system variables for a signal path, are described accurately enough for initial observations as (wherein a multipath propagation or several targets will initially not be modelled for the sake of clarity)

$$s_{an1}(t) = A_a e^{j2\pi(f_0((-1)^{a-1}(\tau+\tau_i)-T_{off,i})+\delta\phi_{0,i})} e^{j(\phi_{p,al}(t)+(-1)^{a-1}\phi_{an})} \cdot e^{-j2\pi t(\Delta f+\mu((-1)^{a-1}\tau-T_{off,i}))}. \quad (1)$$

In principle, then, the mixed signal consists of an amplitude $A_a$,

Two phase terms $e^{j2\pi(f_0((-1)^{a-1}(\tau+\tau_i)-T_{off,i})+\delta\phi_{0,i})} e^{j(\phi_{p,al}(t)+(-1)^{a-1}\phi_{an})}$, And a frequency term $e^{-j2\pi t(\Delta f+\mu((-1)^{a-1}\tau-T_{off,i}))}$.

In the above equation (1), the following applies:

a: Number of station (e.g., 1 or 2)
n: Number of channel (e.g., 1 to 8)
l: Number of ramp (e.g., 1 to 128)
$A_a$: Signal amplitude
$f_0$: Carrier frequency (e.g., about 78 GHz)
$\tau$: Transit time, crossed path
$\tau_i$: Transit time change owing to the movement of an object
$T_{off,i} = T_{off,0} + T_{j,l} + l \cdot T_D$: Timing offset (e.g., owing to cable length, jitter and/or drift)
$\delta\phi_{0,i}$: Phase displacement through carrier frequency drift and/or unknown other components
$\phi_{p,al}(t)$: Phase noise (uncorrelated)
$\phi_{an}$: Phase displacement between stations and individual channels
$\Delta f$: Frequency offset (e.g., 350 kHz)
$\mu$: Sweep rate (e.g., 500 GHz/s)

This transit time change (given an at least approximately uniform movement over the measuring period) is detected via a phase change in the beat frequency, which can be assumed to be at least approximately constant within the measuring period.

The Fourier transformation of a ramp yields the beat signal $$S_{ant}(f) = \mathcal{F}\{s_{ant}(t)\} = A_a e^{j2\pi f_0((-1)^{a-1}(\tau+\tau_l)-T_{off,l}+\delta\phi_{0,l})} \quad (2)$$
$$e^{j(-1)^{a-1}\phi_{an}} \cdot \mathcal{F}\{e^{j\phi_{p,at}(t)}\} * \delta(g - (\Delta f + \mu((-1)^{a-1}\tau - T_{off,l}))).$$

Since this description is basically possible independently of a selected window function, the latter can be omitted. The phase noise in the mixed signal of a station depends on the current phase position, and thus is found to be $\phi_{p,1l(t)} = \psi_{p,1l}(t-T_{off,l}) - \psi_{p,2l}(t-\tau)$ and $\phi_{p,1l(t)} = \psi_{p,1l}(t-\tau-T_{off,l}) - \psi_{p,2l}(t)$. Because the time difference between 2 points in time is critical for the variance of the phase noise (Allan variance), the manifestation at both stations is about the same ($\phi_{p,1l}(t) \sim \phi_{p,2l}(t)$). The phase noise of the local oscillators $\psi_{p,1l}$ and $\psi_{p,2l}$ is not correlated (as opposed to a primary radar), and can (drastically) impair the phase evaluation or signal coherence or velocity measurement.

An algorithm for evaluating the sampled signal (according to equation (1)) is indicated below:

In a first step, for example, the respective spectrum can be calculated via a Fourier transformation out of a Hibert transformation (which might be necessary if no I/Q data are available).

As evident from the spectra on FIG. 11a, 11b, a beat frequency for a crossed path rises (approximately) linearly over time, in addition to which jitters with a ±1 clock can arise. This may be due to the fact that each radar module uses different clock sources. This can be precluded in a modified version, which can be modelled as $$T_{off,l} = T_{off,0} + T_{j,l} + l \cdot T_D,$$

wherein a drift TD along with the (from the standpoint of signal processing) randomly distributed jitter can be corrected in this calculation step. Shown as a random variable, the distribution $$p(T_{j,l}) = \begin{cases} \alpha & \text{for } T_{j,l} = -J_0 \\ 1-2\alpha & \text{for } T_{j,l} = 0 \\ \alpha & \text{for } T_{j,l} = J_0 \end{cases},$$

results for each ramp I, which with probability $\alpha$ leads to a jump by ±1 clock. The change in beat frequency is denoted with $J_0 \sim 12.5$ ns, and depends on the system clock (e.g., here $f_{clk} = 80$ MHz) and sweep rate p.

A region around the crossed path can be (generously) cut out as an interval, so that a resultant signal also contains information about (remotely) distant targets (with a larger beat frequency at the second radar module). In this case, equation (2) describes all relevant signal components.

As evident from equation (2), a beat frequency for a target is identical in all channels (an antenna position is only to vary slightly here).

Absolute values in equation (2) can be added for each channel in both radar modules, as follows:

$$s_{al}(f) = \sum_n |s_{ant}(f)|.$$

What then results is a signal with a relatively high SNR (signal-to-noise ratio), which can be described by $$S_{al}(f) = B_a |\mathcal{F}\{e^{j\phi_{p,at}(t)}\} * \delta(f - (\Delta f + \mu((-1)^{a-1}\tau - T_{off,l})))|$$

wherein $B_a$ denotes the sum of amplitudes for the individual channels. In the system examined (with relatively slight phase noise), this effect produces hardly any change in the beat frequency during a ramp, as permitted by the approximation $$S_{al}(f) \approx B_a \delta(f - (\Delta f + \mu((-1)^{a-1}\tau - T_{off,l}))) \quad (3)$$

As discernible in equation (3), the frequency offset $\Delta f$ and timing offset $T_{off,l}$ leads to a displacement of the beat frequency in the same direction, while the signal transit time produces a displacement with the opposite orientation.

A folding of the signals $S_{1l}(f)$ and $S_{2l}(f)$ of the two stations can be calculated so as to eliminate the signal transmit time $\tau$. The resultant signal $$H(f) = S_{1l}(f) * S_{2l}(f) = \delta(f - 2(\Delta f - \mu T_{off,l}))$$

contains a clear maximum given a frequency at $2(\Delta f - \mu T_{off,l})$. Since the folding encompasses all targets, this operation functions independently of the measured scenario. In the measurement examined, the SNR need only be sufficiently high overall. The maximum can now be determined for each individual ramp, which can be understood as the sequence $$b_l = 2(\Delta f - \mu T_{off,l}) = 2(\Delta f - \mu(T_{off,0} + T_{j,l} + l \cdot T_D)).$$

In order to remove all shares that are constant over time, the differential sequence $$D_l = \frac{(b_l - b_{l+1})}{2} = \frac{2\mu(T_{j,l} + l \cdot T_D - (T_{j,l+1} + (l+1) \cdot T_D))}{2} = \mu(T_{j,l} - T_{j,l+1} - T_D)$$

can be calculated for $l=1 \ldots N-1$, wherein N=128 in this case is an example for the total number of transmitted ramps.

$D_l$ can now be divided into three partial sequences, which are denoted with $c_{1l}$, $c_{2l}$, and $c_{3l}$, and sequentially go with the jumps by 0, $J_0$ and $-J_0$.

A jump height via jitter can be determined through expected value creation $$\hat{J}_0 = (E\{c_{1l}\} + E\{c_{2l}\} + E\{c_{3l}\})/3.$$

A drift can now likewise be estimated through expected value creation $$\hat{T}_D = (E\{c_{2l}\} - E\{c_{3l}\})/2.$$

Figure 13A:
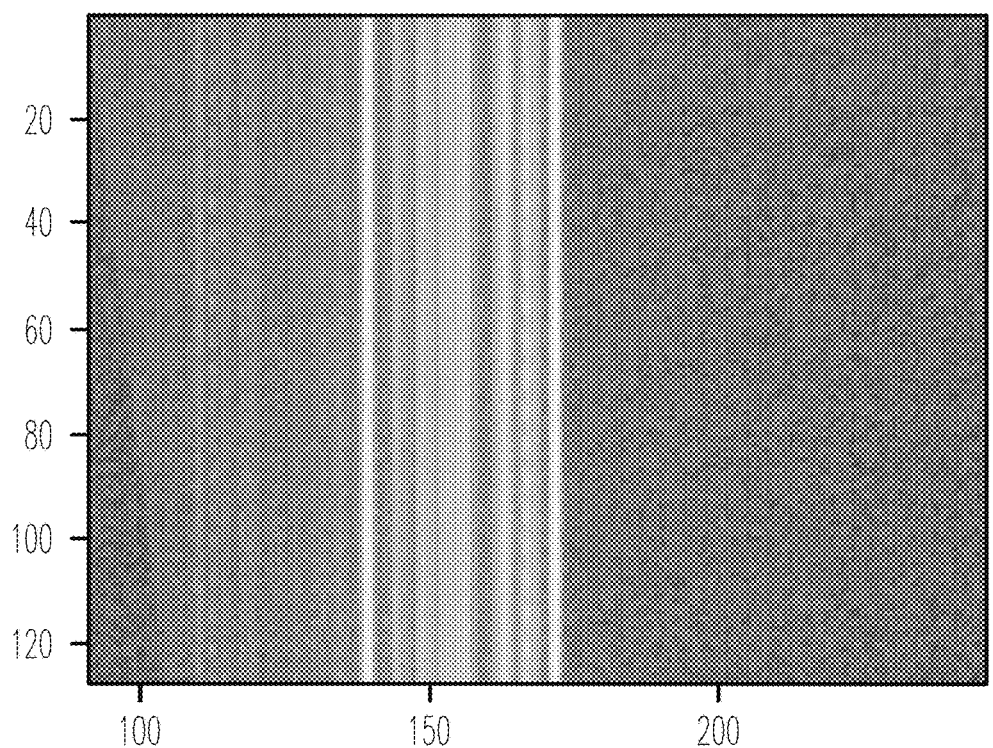
FIG. 13a is an additional spectrogram for the first radar module, after a correction for drift and jitter, wherein the horizontal axis indicates a distance in meters, and the vertical axis indicates a chirp or ramp number.
Figure 13B:
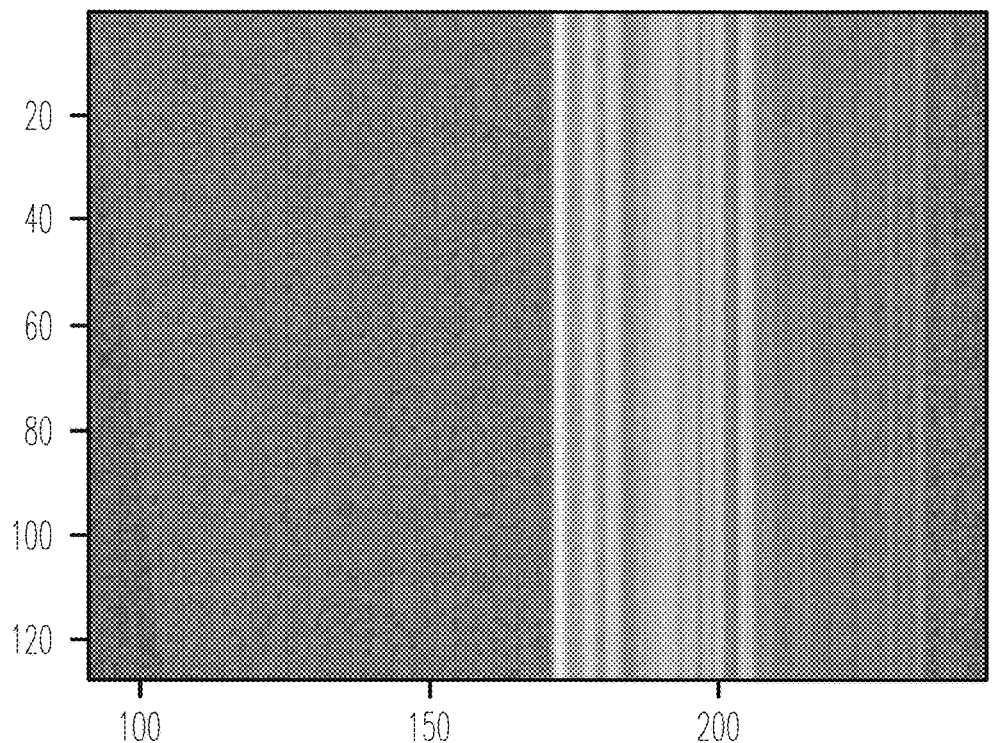
FIG. 13b is an additional spectrogram for the second radar module, after a correction for drift and jitter, wherein the horizontal axis indicates a distance in meters, and the vertical axis indicates a chirp or ramp number.

The two correction values $J_0$ and $T_D$ can now be used to completely describe the sequence $D_l = \mu(T_{j,l} - T_{j,l+1} - T_D)$, and correct for jitter and drift as needed. FIGS. 13a, 13b show spectrograms for both modules (FIG. 13a for the first radar module; FIG. 13b for the second radar module) after correction for drift and jitter.

If necessary, a system without jitter (in the clock magnitude) can be realized when using a shared trigger per module. In this case, however, there may be a clearly smaller residual jitter portion, which is compensated in the other procedural steps.

Synchronization, e.g., via a CAN bus, can potentially prevent the drift of both modules. Clock signal synchronization and a shared trigger make it easy to perform an evaluation with the described method, since jitter no longer arises, and the drift is (negligibly) small.

A correction for transit time and frequency offset will be described below.

A transit time over a synchronization cable or a (preset) frequency offset (for separating primary and secondary responses) can lead to an (unknown) displacement in the beat frequency, which is identical at both stations. Proceeding from equation (3) after applying the corrections described above, the amplitude of the beat signal for both stations amounts to $$S_{al}(f) \approx B_a \delta(f-(\mu((-1)^{a-1}\tau + \Delta f - \mu T_{off,0}))). \quad (4)$$

This signal no longer varies from chirp to chirp, meaning over the ramp number l, which is why the summation over l $$S_a(f) = \sum_l |S_{al}(f)| = C_a \delta(f - (\mu((-1)^{a-1}\tau + \Delta f - \mu T_{off,0}))).$$

leads to strong maxima. The latter are identical in terms of distribution, but lie to the left and right of a "virtual center" $f_m$, which derives from $f_m = \Delta f - T_{off,0}$. A renewed folding of the two channel responses $$H(f) = S_1(f) * S_2(f) = \delta(f - 2(\Delta f - \mu T_{off,l})))$$

makes it possible to determine the maximum of H(f), which can be used as a very precise estimation $\hat{f}_m$ of the virtual center. A preceding correction for drift and jitter is advantageous at this juncture, since the entire SNR can thereby be (distinctly) increased.

The spectrum of one of the stations is now optionally mirrored at this virtual center, after which the amplitudes of the two spectra appear at the same positions, and, after shifting the focal point to a beat frequency of 0 Hz (absolute position of the maxima now corresponds to the actual target distances), can be represented by $$S_{anl}(f) = \quad (5)$$
$$A_a e^{j2\pi f_0((-1)^{a-1}(\tau+\tau_1)-\mu T_{off,l}+\delta\phi_{0,l})} e^{j(-1)^{a-1}\phi_{an}} \cdot \mathcal{F}\{e^{j\phi_{p,al}(t)}\} * \delta(f-\mu\tau).$$

Figure 14A:
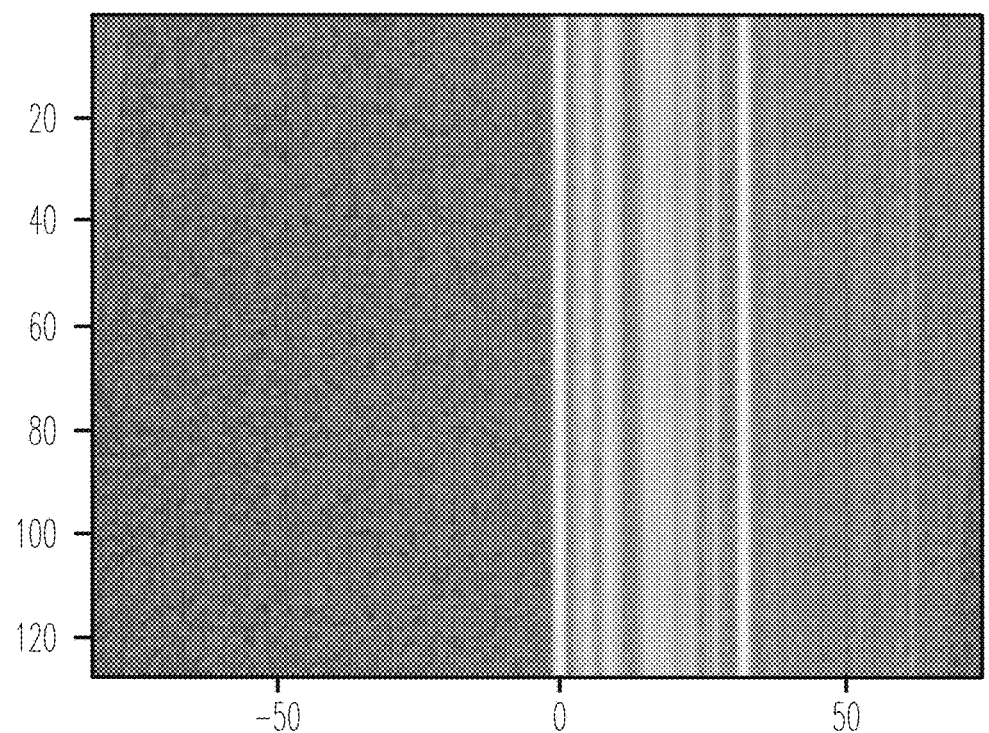
FIG. 14a is an additional spectrogram for the first radar module, after a correction for time and frequency offset, wherein the horizontal axis indicates a distance in meters, and the vertical axis indicates a chirp or ramp number.
Figure 14B:
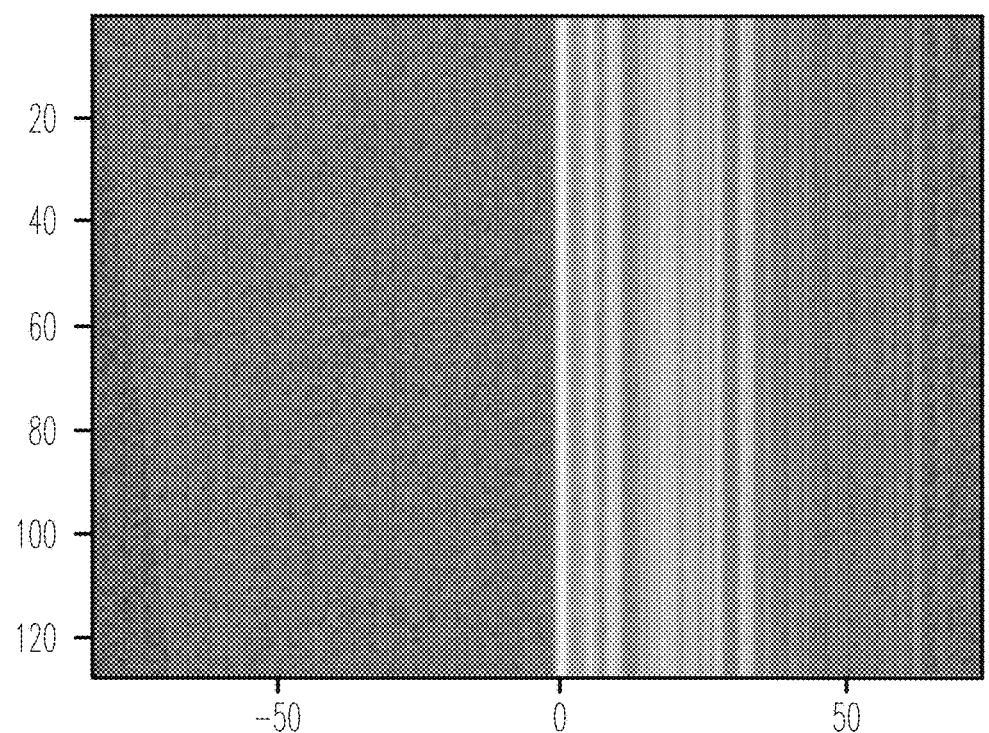
FIG. 14b is an additional spectrogram for the second radar module, after a correction for time and frequency offset, wherein the horizontal axis indicates a distance in meters, and the vertical axis indicates a chirp or ramp number.

FIGS. 14a, 14b show spectrograms of both modules after a correction for the time and frequency offset (FIG. 14a for the first module; FIG. 14b for the second module; both modules were spaced a slight distance apart, thereby making a certain level of crosstalk discernible as the "target" at 0 m.).

A phase variation correction will be explained below.

Figure 15A:
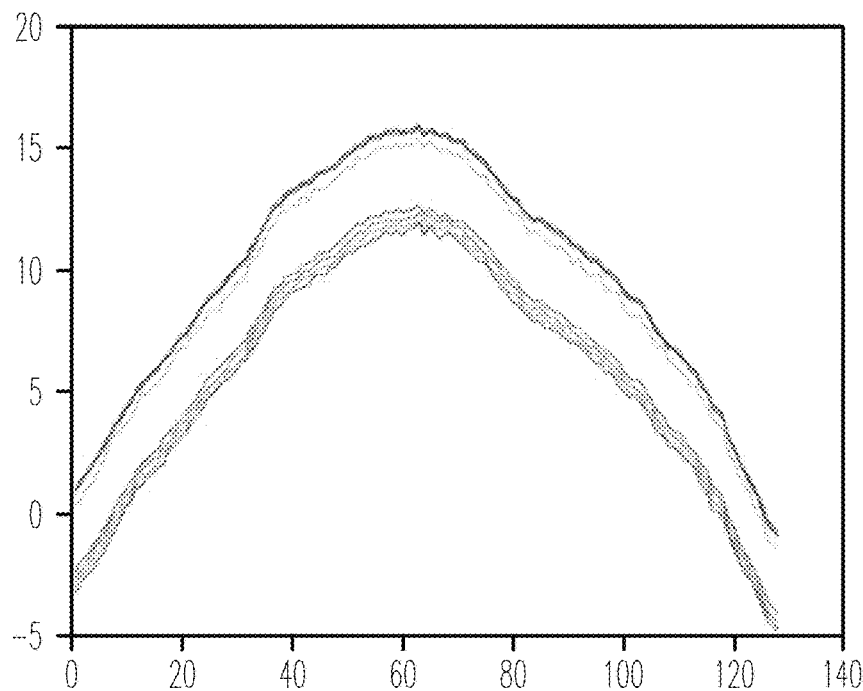
FIG. 15a is a phase progression for the first radar module, without any correction for phase deviation, wherein the horizontal axis indicates a chirp or ramp number, and the vertical axis indicates a phase in radians.
Figure 15B:
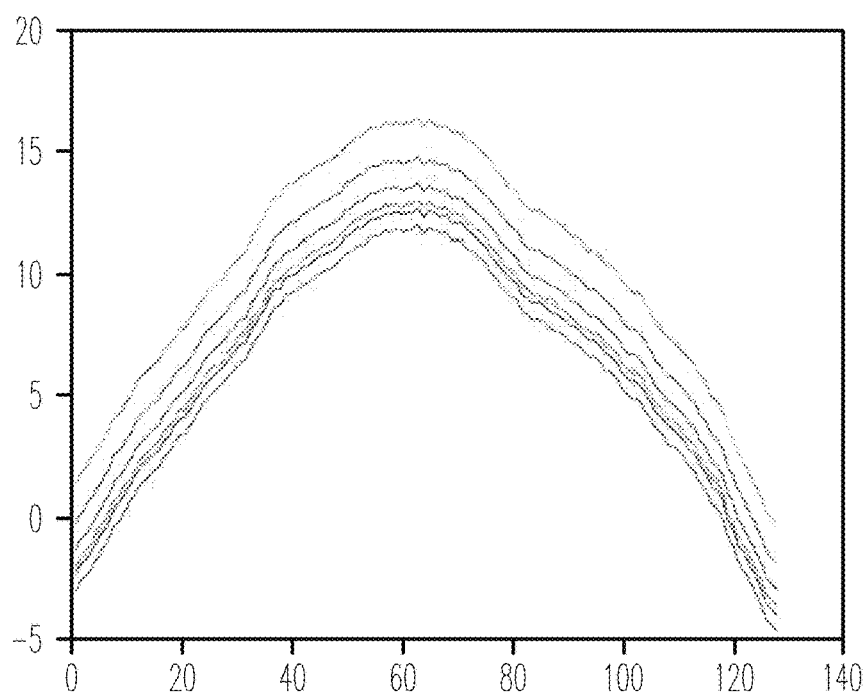
FIG. 15b is a phase progression for the second radar module, without any correction for phase deviation, wherein the horizontal axis indicates a chirp or ramp number, and the vertical axis indicates a phase in radians.

In principle, the phase progression of the two stations coincides for a target (here the one with the largest amplitude), since 128 sequential ramps are transmitted in the present example, as evident from FIGS. 15a, 15b (FIG. 15a for the first module, FIG. 15b for the second module). After correcting for all frequency terms, the spectrograms can be represented as $$S_{anl}(f) = A_a e^{j2\pi f_0((-1)^{a-1}(\tau+\tau_1)-\mu T_{off,l}+\delta\phi_{0,l})} \quad (6)$$
$$e^{j(-1)^{a-1}\phi_{an}} \cdot e^{j\gamma_l} \cdot \mathcal{F}\{e^{j\eta_l(t)}\} * \delta(f-\mu\tau),$$

which now have a quasi-constant beat frequency for a target at a defined distance. This step is to involve correcting the rough influence of phase noise (approximated as $\mathcal{F}$ $\{e^{j\phi_{p,al}(t)}\} \approx e^{j\gamma_l} \mathcal{F}\{e^{j\eta_l(t)}\}$, i.e., a large share of sweep to sweep and a smaller one during an (FMCW) ramp), as well as the influences of the timing offset, modelled as $T_{off,l}$, on the phase position and unknown remaining terms $\delta\phi_{0,l}$, of the two stations. The latter are contained in the equation as $T_{off,l}+\delta\phi_{0,l}$, and arise equally in both stations. In summation, then, a phase displacement $\Gamma_{al}=T_{off,l}+\delta\phi_{0,l}+\gamma_1$ arises from sweep to sweep.

It is basically possible to determine the phase at the largest occurring peak. On the one hand, however, this phase position can only be determined as an overlap given closely adjacent targets; on the other hand, this variant only incorporates the information about a target, which is generally disadvantageous in the case of multipath propagation or several reflection points to be detected.

For this reason, the argument for the complex standard scalar product $$\hat{\Gamma}_l = \frac{1}{8} \sum_n arg\{\langle S^*_{1nl}(f), S_{2nl}(f)\rangle\}/2$$

will at this juncture be evaluated for each (FMCW) sweep and each individual channel, after which the average value will be generated (e.g., with a prefactor ⅛ for 8 receiving channels). This does not influence the phase relationship between the channels. This estimated result can be used to correct the disturbing portion in equation (6), which leads to $$S_{anl}(f) = A_a e^{j2\pi f_0((-1)^{a-1}(\tau+\tau_1))} e^{j(-1)^{a-1}\phi_{an}} \cdot \mathcal{F}\{e^{j\eta_l(t)}\} * \delta(f-\mu\tau), . \quad (7)$$

Figure 16A:
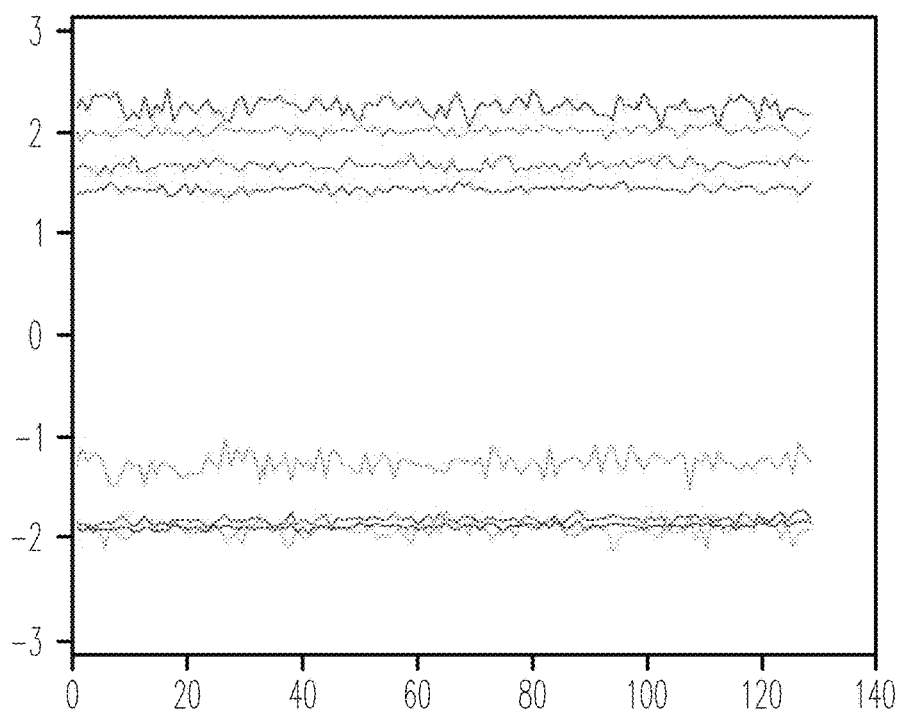
FIG. 16a is a phase progression for the first radar module, with a correction for phase deviation, wherein the horizontal axis indicates a chirp or ramp number, and the vertical axis indicates a phase in radians.
Figure 16B:
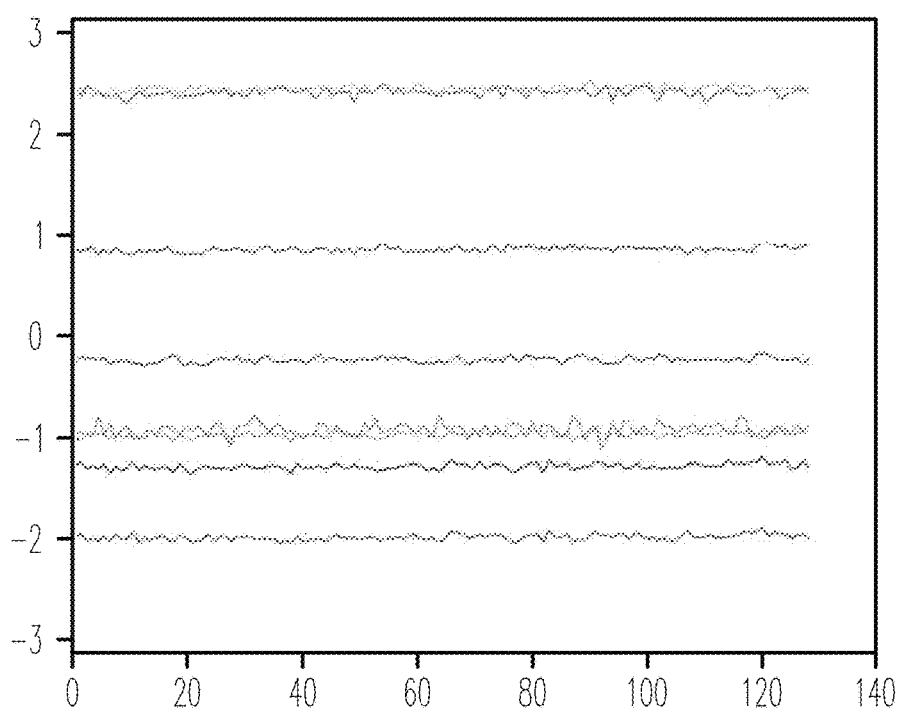
FIG. 16b is a phase progression for the second radar module, with a correction for phase deviation, wherein the horizontal axis indicates a chirp or ramp number, and the vertical axis indicates a phase in radians.

The progression of the phase given a fixed target for both stations and all channels is depicted on FIGS. 16a, 16b (for the first module on FIG. 16a, for the second module on FIG. 16b). The latter only deviates slightly from a constant function (remaining deviations can be corrected in the continued process as needed).

An ensuing complex conjugation of the signals from the second radar module leads to the spectra $$S_{anl}(f) = A_a e^{j2\pi f_0(\tau+\tau_1)} e^{j\phi_{an}} \cdot \mathcal{F}\{e^{j(-1)^{a-1}\eta_l(t)}\} * \delta(f-\mu\tau), , \quad (8)$$

which essentially deviate from a typical primary response only in term $$\mathcal{F}\{e^{j(-1)^{a-1}\eta_l(t)}\}.$$

This portion represents the influence of the uncorrelated phase nose, which leads to a phase deviation within an (FMCW) ramp or an (FMCW) sweep.

In summation, a phase jump between adjacent ramps might be too large for phase tracking in numerous measurements. In particular, a maximum expected phase jump can limit the measurement range in terms of the doppler frequency, and hence in terms of the maximum velocity that can be detected. This problem can be reduced by an improved synchronization of the two stations. A deviation remaining after adjusting the clock rates might not (any longer) result in phase jumps arising over a uniqueness region between adjacent sweeps.

An adjustment and superposition of spectra will be described below.

Before superposing the two spectra, an adjustment can also be performed so as to correct a potential phase displacement of the strongest target given a non-reciprocal channel. In addition, the amplitudes of this target can be aligned for both spectra and/or a standardization to a shared or third variable can take place. After these two operations, the representation for a selected channel n can be as follows $$S_{anl}(f)=Ae^{j2\pi f_0(\tau+\tau_l)}e^{j\phi n}\cdot\delta(f-\mu\tau)*(1+j(-1)^{a-1}\varepsilon_l(t))$$

wherein the phase noise remaining inside a chirp (sweep) can be approximated via Taylor development with termination after the linear term as $$\mathcal{F}\{e^{j(-1)^{a-1}\eta_l(t)}\} \approx 1 + j(-1)^{a-1}\varepsilon_l(t).$$

Following an ensuing addition, the result is a (final) signal model $$S_{nl}(f) = S_{1nl}(f) + S_{2nl}(f) = 2Ae^{j2\pi f_0(\tau+\tau_l)}e^{j\phi_n} \cdot \delta(f-\mu\tau).$$

A corrected signal model will be described below.
The signal for the crossed path $$S_{anl}(f)=A\cdot e^{j2\pi f_0\tau}\cdot e^{j2\pi f_0\tau_l}\cdot e^{j\phi an}\cdot\delta(f-\mu\tau) \quad (8)$$

now (completely) resembles a primary response, and can thus preferably be used for coherent processing. A here represents the amplitude, $e^{j2\pi f_0\tau}$ the initial phase, $e^{j2\pi f_0\tau_l}$ the doppler portion, $e^{j\phi an}$ the angular component and $\delta(f-\mu\tau)$ the accompanying beat frequency. In the case of a multipath propagation or given several targets, the modelling $$S_{anl}(f)=\tau_k A_k\cdot e^{j2\pi f_0\tau_k}\cdot e^{j2\pi f_0\tau_{kl}}\cdot e^{j\phi kan}\cdot\delta(f-\mu\tau_k) \quad (9)$$

results, wherein k corresponds to the number of the individual path.

Figure 17A:
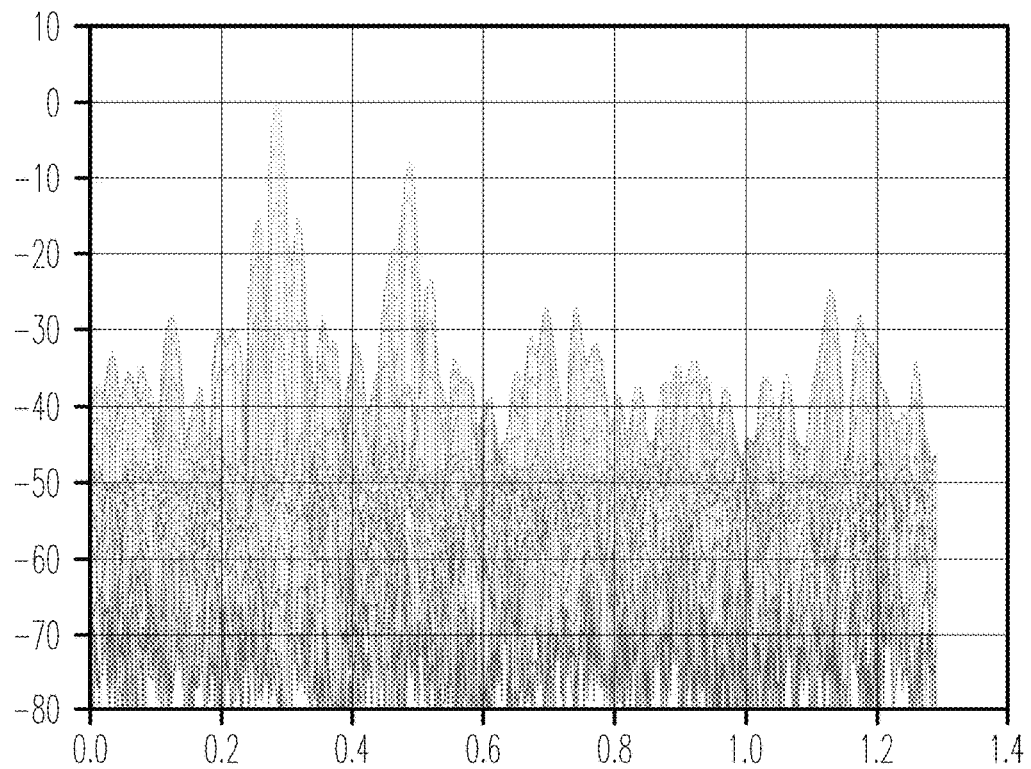
FIG. 17a is a 2D-(FFT) spectrum for the crossed path of the first radar module, with corrections for drift and jitter as well as time and frequency offset, wherein the horizontal axis indicates a velocity in meters per second, and the vertical axis indicates a magnitude in decibels (dB)
Figure 17B:
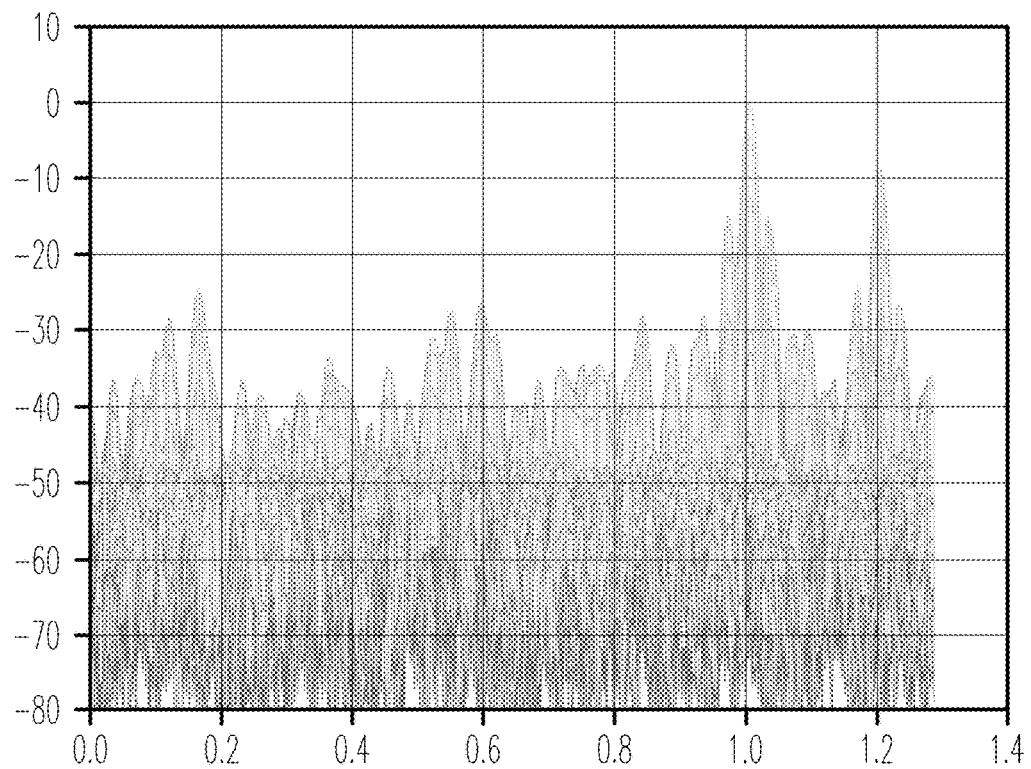
FIG. 17b is a 2D-(FFT) spectrum for the crossed path of the second radar module, with corrections for drift and jitter as well as time and frequency offset, wherein the horizontal axis indicates a velocity in meters per second, and the vertical axis indicates a magnitude in decibels (dB)

The corrections described above makes it possible to generate an improved 2D range doppler plot or a simple doppler plot as on FIGS. 17a, 17b [sic] (show the plots without corrected phase variations; FIGS. 18a, 18b show plots with corrected phase variations; FIG. 17a, 18a for the first module, FIG. 18a, 18b for the second module), from which the velocity can be comparatively accurately derived. A remaining phase noise, which on the crossed path is significantly stronger than for a primary radar response, becomes noticeable in the form of randomly distributed, small peaks. These are distributed over all velocities and (quasi) identical in the first and second module (but phase displaced by 180 degrees). After adding both 2D spectra, a spectrum arises (see FIG. 19) that (except potentially for a comparatively small amplitude noise) corresponds to that of a primary radar (see FIG. 20a for the first module and FIG. 20b for the second module). This leads to significantly more measuring dynamics, whereupon weak targets (in the environment of strong targets) also become discernible. This method is here shown for an individual channel, since varying azimuth angles can result in an additional phase offset.

The method just described for reducing interference components, in particular phase noise, has a series of advantages (in particular in the automotive area). In particular, an improved SNR (signal-to-noise ratio) and an elevated reliability can be achieved. Furthermore, the distance and velocity vector of a target can be estimated with a comparatively high accuracy, since additional estimation values are available and can be used.

A (coherent) processing of a frequency displacement caused by a doppler effect can also take place smoothly via a crossed path. Phase information from a first radar module and a second radar module can thus be used to perform a precise measurement of the surroundings. As a result, SAR processing can be implemented, in particular in an automobile radar application, for generating a high-resolution image of the surroundings.

An application as a phase monopole with both stations can serve to be able to very precisely estimate an azimuth angle. This estimate can also be used in conjunction with existing angular information to further increase accuracy.

Feeding in an external, controlled clock made it possible to recognize that a rough synchronization (pre-synchronization) is basically possible, for example which would be conceivable via a CAN bus (of a motor vehicle). As a result, the computing outlay for the method can be reduced, and the error propagation can be diminished.

Additional information makes it possible to raise the probability for validating the plausibility of radar targets in road traffic. If a measurement of the crossed path is (directly) measured for each target, an additional estimation of velocity, azimuth angle and distance can be made available, which in particular can facilitate tracking.

Reflections of complex objects can be recognized with comparatively no problem, possibly even when they are not going in the direction of an incident wave (bistatic radar principle). A combination of several radar modules makes it possible to (distinctly) improve an estimate of a proper motion of the moving object (vehicle), since the accuracy of the angular measurement significantly influences the latter.

Combining several radar modules in the direction of elevation makes it possibly to distinctly improve a height estimate, in particular by means of interferometric SAR, i.e., an estimate of the height profile of a (complete) surroundings of a moving object (vehicle).

Aspects and embodiments of method I or configuration I will be described below. The reference numbers here relate to the figures from DE 10 2014 104 273 A1. The transmitter-receiver units can be part of the radar modules or comprise the latter:

Aspect 1: Method in a radar system, in which
  in a first (non-coherent) transmitter-receiver unit (NKSE1), a first signal (sigTX1) is generated and transmitted, in particular emitted, over a path (SP),
  in an additional, in particular second (non-coherent) transmitter-receiver unit (NKSE1), a first signal (sigTX2) is generated and transmitted, in particular emitted, over the path (SP),
  in the first transmitter-receiver unit (NKS1), a comparison signal (sigC12) is formed out of its first signal (sigTX1) and out of such a first signal (sigRTX2) received by the additional transmitter-receiver unit (NKSE2) over the path (SP), and
  in the additional transmitter-receiver unit (NKSE2), an additional comparison signal (sigC21) is formed out of its first signal (sigTX2) and out of such a first signal (sigTX1) received by the first transmitter-receiver unit (NKSE1) over the path (SP),
  wherein the additional comparison signal (sigC21) is transmitted, in particular communicated, from the additional transmitter-receiver unit (NKSE2) to the first transmitter-receiver unit (NKSE1).

Aspect 2: Method according to the first aspect, in which a comparison-comparison signal (sigC21; sigC12) is formed out of this comparison signal (sigC21) and the additional comparison signal (sigC21).

Aspect 3: Method according to the second aspect, in which the comparison-comparison signal (sigC21; sigC12) is made to correspond to a comparison signal generated by a coherent radar system by processing the two comparison signals (sigC12, sigC21) with each other, in particular subjecting them to conjugated complex multiplication.

Aspect 4: Method according to a preceding aspect, in which at least one of the comparison signal (sigC12), the additional comparison signal (sigC21) or the comparison-comparison signal (sigC21; sigC12) is formed via either mixing or correlation.

Aspect 5: Method according to a preceding aspect, in which at least one such additional comparison signal (sigC21; sigC12) is transmitted between the transmitter-receiver units (NKSE2; NKSE1) as at least one of data, a signal containing data or a signal reconstructably containing data.

Aspect 6: Method according to a preceding aspect, in which at least one of the first signals (sigTX2, sigTX2) is transmitted as a transmitted signal over the path (SP) designed as an air interface.

Aspect 7: Method according to a preceding aspect, in which the points in time for transmitting the first signals (sigTX1, sigTX2) are coordinated in such a way that the first signals (sigTX1, sigTX) at least partially chronologically overlap.

Aspect 8: Method according to a preceding aspect, in which a signal transmit time ($\tau 12$) that such a first signal (sigTX1, sigTX2) requires for the path between the transmitter-receiver units (NKSE1, NKSE2) is determined out of at least one comparison-comparison signal (sigC21; sigC12) by analyzing at least one of a phase or a phase value ($\varphi 12$, $\varphi 13$, ... $\varphi 1N$, $\varphi 22$, $\varphi 23$, $\varphi 24$, ... $\varphi 2N$, ... $\varphi N-1N$) of a frequency, an amplitude progression or a phase progression of the comparison-comparison signal (sigCC12).

Aspect 9: Method according to a preceding aspect, in which at least one of the first signals (sigTX1, sigTX2) is generated and transmitted as an FMCW or OFDM modulated signal.

Aspect 10: Method according to a preceding aspect, in which at least one of the first signals (sigTX1, sigTX2) is generated and transmitted as a multi-ramp signal.

Aspect 11: Method according to a preceding aspect, in which
several comparison-comparison signals (sigCC12) are measured chronologically one after the other with at least two transmitter-receiver units (NKSE1, NKSE2), of which at least one of the transmitter-receiver units (NKSE1, NKSE2) moves, and
a synthetic aperture process is used to determine at least one of a distance, a position, a velocity or the presence of one of the transmitter-receiver units (NKSE2, NKSE1) or the presence of such a transmitter-receiver unit (NKSE2, NKSE1) or at least one of a distance, a position, a velocity relative to an object (O) or the presence of an object (O).

Aspect 12: A radar system, in which
at least a first (non-coherent) transmitter-receiver unit (NKSE1) is designed to generate a first signal (sigTX1) and transmit, in particular emit, it over a path (SP),
at least one additional, in particular second (non-coherent) transmitter-receiver unit (NKSE1) is designed to generate a first signal (sigTX2) and transmit, in particular emit, it over the path (SP),
the first transmitter-receiver unit (NKS1) is designed to form a comparison signal (sigC12) out of its first signal (sigTX1) and out of such a first signal (sigTX2) received by the additional transmitter-receiver unit (NKSE2) over the path (SP),
the additional transmitter-receiver unit (NKSE2) is designed to form an additional comparison signal (sigC21) out of its first signal (sigTX2) and out of such a first signal (sigTX1) received by the first transmitter-receiver unit (NKSE1) over the path (SP), and
the additional comparison signal (sigC21) is transmitted, in particular communicated, from the additional transmitter-receiver unit (NKSE2) to the first transmitter-receiver unit (NKSE1).

Aspect 13: Radar system according to aspect 12, in which a comparison-comparison signal (sigCC21; sigCC12) is formed out of this comparison signal (sigC21) and the additional comparison signal (sigC21).

Aspect 14: Radar system according to aspect 12 or 13 with three or more transmitter-receiver units (NKSE1, NKSE2, NKSE3, ..., NKSE-N) spaced spatially apart from each other, in which, out of two or more comparison-comparison signals (sigCC12, sigCC12, sigCC13, sigCC22, ..., sigCC32) measured with more than two pairs of a respective two of the transmitter-receiver units (NKSE1, NKSE2; NKSE-N, NKSE2) spaced spatially apart, a distance, a position, a velocity or the presence of one of the transmitter-receiver units (NKSE2, NKSE1) or the presence of such a transmitter-receiver unit (NKSE2, NKSE1) or at least one of a distance, a position, a velocity relative to an object (O) or the presence of an object (O) is determined.

Aspect 15: Radar system according to one of aspects 12 to 14, in which the first transmitter-receiver unit (NKSE1) and at least one such additional transmitter-receiver unit (NKSE2) and/or an evaluation device (P) are designed to implement a method according to one of the preceding claims.

Aspect 16: Device of a radar system, in particular for implementing a method according to one of aspects 1 to 11 and/or in a radar system according to one of aspects 12 to 15, wherein the device
is designed as a first (non-coherent) transmitter-receiver unit (NKSE1) and
has a signal generator and at least one antenna (TA1; RA1), which are designed to generate a first signal (sigTX1) and transmit, in particular emit, it over a path (SP),
has a layout designed to form a comparison signal (sigC12) out of the and out of such a first signal (sigTX2) received by the additional transmitter-receiver unit (NKSE2) over the path (SP),
and at least one of
an interface (CommTX), which is designed to transmit, in particular communicate, the comparison signal (sigC12) to the additional transmitter-receiver unit (NKSE2), or
an interface (mRX), which is designed to receive such an additional comparison signal (sigC21) generated by the additional transmitter-receiver unit (NKSE2) in the first transmitter-receiver unit (NKSE1) via transmission, in particular communication.

Aspect 17: Device according to aspect 16 with an additional comparison unit (sigComp12), which forms a comparison-comparison signal (sigCC12) out of the comparison signal (sigC21) formed in the same transmitter-receiver unit (NKSE1) and the comparison signal (sigC21) transmitted to this transmitter-receiver unit (NKSE1).

Aspect 18: Device according to aspect 16 or 17, in which the at least one interface (CommTX, CommRX) is a data interface.

Aspect 19: Device according to one of aspects 16 to 18, in which a filter (FLT) is arranged between the arrangement that outputs the comparison signal (sigC12) and the additional comparison unit (sigComp12) that forms the comparison-comparison signal (sigCC12), wherein the filter (FLT) applies the comparison signal (sigC12) to the comparison unit (sigComp12), wherein the filter (FLT) does not apply an additional comparison signal (sigC11) formed in the arrangement upstream from the filter (FLT), and suppresses the comparison signal (sigC11) formed in the upstream arrangement or provides it at a terminal.

Aspect 20: Device according to one of aspects 16 to 19, which has a plurality of receiver antennas (RA1,1, . . . , RA1,N; RA2,1, . . . , RA2,N) spaced spatially apart from each other, which each have allocated to them a layout designed to form a respective comparison signal (sigC21,1, sigC21,2, sigC21,3) out of the first signal (sigTX2) and out of such a first signal (sigTX1) received by such an additional transmitter-receiver unit (NKSE2) over the path (SP).

Aspects and embodiments of method II or configuration II will be described below. The reference numbers here relate to FIGS. 1 to 4 of the present application. The transmitter-receiver units can be part of the radar modules or comprise the latter:

Aspect 1: Method for reducing disturbances by phase noise in a radar system, in which
- in a first (non-coherent) transmitter-receiver unit (NKSE1), a first signal (sigTX1) is generated and transmitted, in particular emitted, over a path (SP),
- in an additional, in particular second (non-coherent) transmitter-receiver unit (NKSE1), a first signal (sigTX2) is generated and transmitted, in particular emitted, over the path (SP),
- the first signals (sigTX1 and sigTX2) are directly or indirectly received in the respective additional transmitter-receiver unit, and there further processed as received signals (sigRX12 and sigRX21),
- in the first transmitter-receiver unit (NKS1), a comparison signal (sigC12) is formed out of its first signal (sigTX1) and out of such a first signal (sigRTX2) received by the additional transmitter-receiver unit (NKSE2) over the path (SP), and
- in the additional transmitter-receiver unit (NKSE2), an additional comparison signal (sigC21) is formed out of its first signal (sigTX2) and out of such a first signal (sigTX1) received by the first transmitter-receiver unit (NKSE1) over the path (SP),
- wherein the additional comparison signal (sigC21) is transmitted, in particular communicated, from the additional transmitter-receiver unit (NKSE2) to the first transmitter-receiver unit (NKSE1),
- wherein, in a first step, deviations in the comparison signals (sigC21 and sigC12) caused by systematic deviations in the transmitter-receiver units (NKE2, NKSE1) are compensated,
- wherein, in a second step, at least one complex value from a first of the two comparison signals or a signal derived from this first comparison signal is used to adjust at least one complex value of the second of the two comparison signals or a value of a signal that was derived from this second comparison signal, and thereby form an adjusted signal (sigCC),
- wherein the adjustment takes place in such a way that a mathematical operation forms the vectorial sum or the difference of complex values, or forms the sum or the difference of the phases of the complex values.

Aspect 2: Method according to aspect 1, wherein the transmitted signals (sigTX1 and sigTX2) are FMCW modulated.

Aspect 3: Method according to aspect 1 or 2, wherein a clock rate adjustment, in particular of signal sources of the first signals (sigTX1 and sigTX2), takes place via a bus system, preferably a communications bus, and/or wherein a clock rate adjustment, in particular of clock rates for signal sources of the first signals (sigTX1 and sigTX2), takes place via radio waves and/or via a cable connection, in particular during operation as the primary radar.

Aspect 4: Method according to one of the preceding aspects, wherein a synchronization of the (non-coherent) transmitter-receiver units (NKSE1, NKSE2), in particular a pre-synchronization by determining a frequency drift, takes place over several ramps in succession, in particular when using a secondary radar.

Aspect 5: Method according to one of the preceding aspects, wherein an offset, in particular a time offset and/or a frequency offset, is determined via a bus system, preferably during operation as a primary radar.

Aspect 6: Method according to one of the preceding aspects, wherein a/the offset, in particular a/the time offset and/or a/the frequency offset, is determined by evaluating a position of in particular corrected maxima for the spectra of the comparison signals (sigC12 and sigC21).

Aspect 7: Method according to one of the preceding aspects, wherein the first and/or the additional (non-coherent) transmitter and receiver unit has at least one evaluation device for performing the individual procedural steps, in particular calculations and evaluations, wherein the respective evaluation device
is possibly a self-contained evaluation device, which is connected to the respective transmitter and receiver unit or the remaining components of the respective transmitter and receiver unit, or
is possibly integrated into the first and/or the additional (non-coherent) transmitter and receiver unit, for example in a shared housing and/or as a unit.

Aspect 8: Method according to one of the preceding aspects, wherein the comparison signals (sigC12 and sigC21) are transmitted to an in particular shared evaluation unit, and are there both present for evaluation, wherein the shared evaluation unit is optionally the first (non-coherent) transmitter-receiver unit (NKSE 1), or optionally the second (non-coherent) transmitter-receiver unit (NKSE2), or optionally another, in particular separate, evaluation unit.

Aspect 9: Method according to one of the preceding aspects, wherein the first signals (TX1 and TX2) are transmitted at least chronologically overlapping, wherein the additional first signal (TX2) of the additional (non-coherent) transmitter-receiver unit (NKSE2) is preferably transmitted during half of the signal duration of the first signal (TX1) of the first (non-coherent) transmitter-receiver unit (NKSE2), further preferably at least approximately simultaneously.

Aspect 10: Method according to one of the preceding aspects, wherein the spectra of the comparison signals are standardized to the highest value prior to the mathematical operation.

Aspect 11: System for reducing disturbances by phase noise in a radar system with units for implementing the method according to one of the preceding claims, in particular comprising:

a first (non-coherent) transmitter-receiver unit (NKSE1) for generating a first signal (sigTX1) and for transmitting, in particular emitting, the first signal (sigTX1) over a path (SP), an additional, in particular second (non-coherent) transmitter-receiver unit (NKSE1) for generating a first signal (sigTX2) and for transmitting, in particular emitting, the first signal (sigTX2) over a path (SP), wherein the (non-coherent) transmitter-receiver units (NKSE1 and NKSE2) are designed to directly or indirectly receive the first signals (sigTX1 and sigTX2), and there further process them as received signals (sigRX12 and sigRX21), wherein the first transmitter-receiver unit (NKS1) is designed to form a comparison signal (sigC12) out of its first signal (sigTX1) and out of such a first signal (sigTX2) received by the additional transmitter-receiver unit (NKSE2) over the path (SP), and wherein the additional transmitter-receiver unit (NKSE2) is designed to form an additional comparison signal (sigC21) out of its first signal (sigTX2) and out of such a first signal (sigTX1) received by the first transmitter-receiver unit (NKSE1) over the path (SP), wherein a transmission unit is provided to transmit, in particular communicate, the additional comparison signal (sigC21) from the additional transmitter-receiver unit (NKSE2) to the first transmitter-receiver unit (NKSE1), wherein at least one evaluation unit is provided, which is designed in a first step to compensate for deviations in the comparison signals (sigC21 and sigC12) caused by systemic deviations in the transmitter-receiver units (NKE2, NKSE1), and in a second step to use at least one complex value from a first of the two comparison signals or a signal derived from this first comparison signal to adjust at least one complex value of the second of the two comparison signals or a value of a signal that was derived from this second comparison signal, and thereby form an adjusted signal (sigCC), wherein the adjustment takes place in such a way that a mathematical operation forms the vectorial sum or the difference of complex values, or forms the sum or the difference of the phases of the complex values.

Aspect 12: System according to aspect 11, wherein a bus system, in particular a communications bus, is provided for a clock rate adjustment, in particular of signal sources of the first signals (sigTX1 and sigTX2),
and/or wherein a bus system is provided for determining an offset, in particular a time offset and/or frequency offset.

Aspect 13: System according to one of aspects 11 or 12, wherein a shared transmitter and receiver antenna is provided in the first and/or the additional (non-coherent) transmitter-receiver unit (NKSE1 and/or NKSE2), and/or wherein a transmission mixer is provided in the path (SP).

Aspect 14: Use of the method according to one of aspects 1 to 10 for a system with at least one shared transmitter and receiver antenna each in the first and/or second (non-coherent) transmitter-receiver unit (NKSE1 and/or NKSE2).

Aspect 15: Use of the method according to one of aspects 11 to 13 for reducing disturbances by phase noises in a radar system.

Let it be noted at this juncture that all parts or functions described above are claimed as essential to the invention, taken separately and in any combination, in particular the details shown on the drawings. Modifications thereof are familiar to the expert.

The invention claimed is:

1. A radar system for capturing surroundings of an object, the system mounted or mountable on the object, wherein the radar system comprises:
at least two non-coherent radar modules, the at least two non-coherent radar modules respectively comprising a transmitter and a receiver, the radar modules arranged or arrangeable on the object in a distributed fashion;
at least one evaluation device configured to:
process transmitted and received signals provided by respective radar modules to establish measurement signals that are coherent in relation to each other; and
perform phase noise compensation, including:
determining variation between spectra corresponding to respective measurement signals by determining a scalar product of a first measurement signal spectrum and a second measurement signal spectrum; and
canceling a phase noise portion of a respective spectrum amongst the measurement spectra separate from determining a variation between spectra.

2. The system according to claim 1, wherein the at least two radar modules are connected to each other by a bus system.

3. The system according to claim 1, wherein
a first signal is generated in a first radar module and transmitted over a path;
an additional first signal generated in a second radar module and transmitted over a path;
wherein in the first radar module, a first evaluation device forms a first comparison signal from the first signal of the first radar module and from a representation of the additional first signal received by the second radar module over the path; and
wherein in the second radar module, a second evaluation device forms a second comparison signal from the additional first signal and from a representation of the first signal received by the first radar module over the path; and
wherein the second comparison signal is transmitted from the second radar module to the first radar module.

4. The system according to claim 3, wherein the first evaluation device or the second evaluation device is configured to form a comparison-comparison signal from the first comparison signal and the second comparison signal.

5. The system according to claim 3, wherein the first evaluation device or the second evaluation device is configured to use at least one complex value from a first comparison signal or a signal derived from the first comparison signal to adjust at least one complex value of the second comparison signal or a value of a signal derived from the second comparison signal, to form an adjusted signal, the adjusting comprising a vectorial sum or a vectorial difference of complex values, or comprising a sum or a difference of respective phases of the complex values.

6. The system according to claim 4, wherein the comparison-comparison signal corresponds to a comparison signal generated by a coherent radar system, the comparison-comparison signal generated by forming a complex conjugate of one of the first comparison signal or the second comparison signal, and multiplying a conjugated comparison signal or second comparison signal by a remaining comparison.

7. The system according to claim 1, wherein the radar modules are arranged to have a distance between each other of at least 5 cm.

8. The system according to claim 1, wherein the at least one evaluation device is configured to determine an angular position of a surrounding structure using at least one of a phase monopulse method or a state-space method.

9. The system according to claim 1, wherein the at least one evaluation device is configured to use a holography method for determining at least one of an angular position, a velocity or an acceleration of a surrounding structure.

10. The system according to claim 1,
wherein the at least one evaluation device is configured to determine at least one of a velocity or an acceleration by comparing a change in differential phases of the received signals.

11. The system according to claim 1, wherein the at least one evaluation device is configured to perform a synthetic aperture radar (SAR) method or an imaging method.

12. The system according to claim 1, wherein the radar modules are arranged or arrangeable on the object at varying heights with respect to each other for measuring a height of a surrounding.

13. The system of claim 1, wherein the object comprises a crane.

14. A method for capturing surroundings of an object, the method comprising:
process transmitted and received signals provided by respective non-coherent radar modules arranged on or within the object, the arrangement in a distributed fashion, the transmitted and received signals of the radar modules processed to establish measurement signals that are coherent in relation to each other; and
perform phase noise compensation, including:
determining variation between spectra corresponding to respective measurement signals by determining a scalar product of the spectra; and
canceling a phase noise portion of a respective spectrum amongst the measurement spectra separate from determining a variation between spectra.

15. The method according to claim 14, wherein
generating a first signal in a first radar module and transmitting the first signal over a path;
generating an additional first signal in a second radar module and transmitting the additional first signal over a path;
forming a first comparison signal (sigC12) from the first signal of the first radar module and from a representation of the additional first signal received by the second radar module over the path; and
forming a second comparison signal from the additional first signal of the second radar module and from a representation of the first signal received by the first radar module over the path;
wherein a comparison-comparison signal is formed from the first comparison signal and the second comparison signal;
wherein deviations in the first and second comparison signals caused by systematic deviations in the first and second radar modules are compensated; and
wherein at least one complex value from at least one comparison signal amongst the two comparison signals is used to adjust at least one complex value of the other of the two comparison signals to form an adjusted signal.

16. The method according to claim 14, comprising determining at least one of a distance, an angular position, a velocity, an acceleration, or an image of a surroundings of the object using the measurement signals or the spectra corresponding to the measurement signals.

17. The system according to claim 1, wherein amplitudes of the spectra corresponding to the measurement signals are normalized.

18. The method according to claim 14, wherein amplitudes of the spectra corresponding to the measurement signals are normalized.

19. The system according to claim 9, wherein the at least one evaluation device is configured to use the holography method for determining a vectorial representation of the velocity of the surrounding structure.

20. The system according to claim 10, wherein the at least one evaluation device is configured to determine a vectorial representation of the velocity by comparing a change in differential phases of the received signals.

21. The method according to claim 16, comprising determining a vectorial representation of velocity of the object using the measurement signals or the spectra corresponding to the measurement signals.

22. The system according to claim 1, wherein the canceling the phase noise portion of the respective spectrum amongst the measurement spectra separate from determining the variation between spectra comprises summing a representative spectrum adjusted using the determined variation between spectra with a complex conjugate representation of the spectrum adjusted using the determined variation between spectra.

23. The method according to claim 14, wherein the canceling the phase noise portion of the respective spectrum amongst the measurement spectra separate from determining the variation between spectra comprises summing a representative spectrum adjusted using the determined variation between spectra with a complex conjugate representation of the spectrum adjusted using the determined variation between spectra.

* * * * *